United States Patent
Wang et al.

(10) Patent No.: US 10,778,826 B1
(45) Date of Patent: Sep. 15, 2020

(54) SYSTEM TO FACILITATE COMMUNICATION

(71) Applicant: AMAZON TECHNOLOGIES, INC., Seattle, WA (US)

(72) Inventors: Chia-Jean Wang, Palo Alto, CA (US); Babak Amir Parviz, Seattle, WA (US); Avi Bar-Zeev, Oakland, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/157,324

(22) Filed: May 17, 2016

Related U.S. Application Data

(60) Provisional application No. 62/163,242, filed on May 18, 2015.

(51) Int. Cl.
| | |
|---|---|
| H04M 1/60 | (2006.01) |
| G06F 3/16 | (2006.01) |
| G10L 15/00 | (2013.01) |
| H04B 1/3827 | (2015.01) |

(52) U.S. Cl.
CPC .......... *H04M 1/6058* (2013.01); *G06F 3/167* (2013.01); *G10L 15/00* (2013.01); *H04B 1/385* (2013.01); *H04B 2001/3866* (2013.01)

(58) Field of Classification Search
CPC ... H04M 1/6041; H04M 1/6066; H04M 3/568
USPC .......... 455/569.1, 56.2, 575.1, 575.2, 575.6, 455/90.1–90.3, 567, 566, 564, 422.1, 403, 455/426.1, 445, 412.1, 412.2, 412.299; 340/539.1, 538.11; 345/8
See application file for complete search history.

(56) References Cited

U.S. PATENT DOCUMENTS

| | | | |
|---|---|---|---|
| 2008/0152160 A1* | 6/2008 | Chew | H04H 20/61 381/71.6 |
| 2009/0150160 A1* | 6/2009 | Mozer | G06F 3/011 704/275 |
| 2010/0079356 A1* | 4/2010 | Hoellwarth | G02B 27/017 345/8 |
| 2010/0110368 A1* | 5/2010 | Chaum | G02B 27/017 351/158 |
| 2013/0217370 A1* | 8/2013 | Gerald | H04W 4/02 455/415 |
| 2013/0316679 A1* | 11/2013 | Miller | H04M 1/6041 455/412.1 |
| 2014/0187213 A1* | 7/2014 | Shuster | H04W 4/023 455/414.1 |

(Continued)

*Primary Examiner* — Keith Ferguson
(74) *Attorney, Agent, or Firm* — Lindauer Law, PLLC

(57) ABSTRACT

Described are systems and methods for facilitating communication between a user and other users, services, and so forth. A wearable device, such as a pair of glasses, may be worn and used in conjunction with another user device, such as a smartphone, to support communications between the user and others. Inputs such as motion of the head, orientation of the head, verbal input, and so forth may be used to initiate particular functions on the wearable device, the user device, or with a service. For example, a user may turn their head to the left and speak to send a message to a particular person. A display light in the field of view of the user may illuminate to a particular color that has been previously associated with the particular person. This provides visual feedback to the user about the recipient of the message.

20 Claims, 10 Drawing Sheets

(56) References Cited

U.S. PATENT DOCUMENTS

| | | | |
|---|---|---|---|
| 2015/0112678 A1* | 4/2015 | Binks | G10L 25/48 704/236 |
| 2015/0212576 A1* | 7/2015 | Ambrus | G06F 3/013 345/156 |
| 2016/0285793 A1* | 9/2016 | Anderson | H04L 51/046 |

\* cited by examiner

SYSTEM TO FACILITATE COMMUNICATION

PRIORITY

This application claims priority to U.S. Provisional Patent Application Ser. No. 62/163,242 filed on May 18, 2015 entitled "System to Facilitate Communication." The entirety of this previously filed application is hereby incorporated by reference.

INCORPORATION BY REFERENCE

U.S. Pat. No. 9,070,366 entitled "Architecture For Multi-Domain Utterance Processing" to Lambert Mathias et al. filed Dec. 19, 2012 is hereby incorporated by reference for all that it discloses.

BACKGROUND

Enhanced communication between a user and resources such as other users, services, and so forth, conveys many advantages. It is desirable to provide a user with persistent and easy access to these resources.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
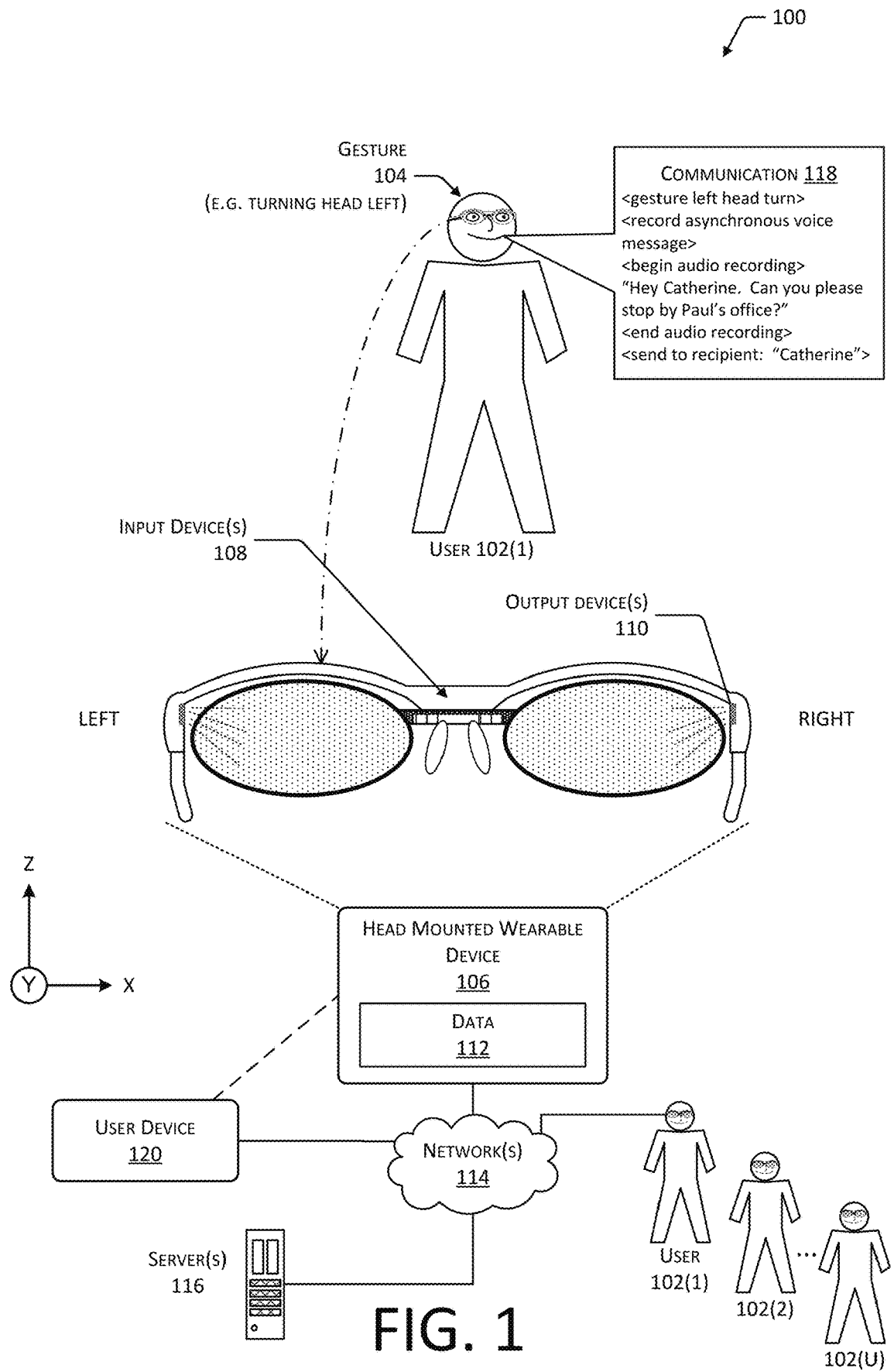
FIG. 1 depicts a system including a head-mounted wearable device including a transducer at the nosepiece acting as a bone conduction microphone and one or more servers, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

The structures depicted in the following figures are not necessarily according to scale. Furthermore, the proportionality of one component to another may change with different implementations. In some illustrations the scale of a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device having a form factor similar to eyeglasses, hearing aid, headphones, hat, hair clip, and so forth may provide a ubiquitous and easily worn device to access information.

Traditional techniques to control when and how communication takes place have involved cumbersome user interfaces. For example, a user may have to touch a control to establish a telephone call.

Described in this disclosure are devices and techniques for improving communication between a user and other resources. The other resources may include other users, services, and so forth. For example, user "Abbott" may speak to user "Bond" to discuss schedules, ask questions, visit, and so forth. In another example, user Abbott may use speech to access services such as requesting pricing or availability information for one or more items, seeking an answer to a question, and so forth.

As mentioned above, the head-mounted wearable device (HMWD) may be in the form factor of a pair of glasses. The glasses may include lenses that are either plano (non-prescription) or formed to provide a particular refractive prescription. The lenses may be tinted, un-tinted, and so forth. The wearable device may include a computing device, one or more input devices such as sensors, one or more output devices, and so forth. For example, the wearable device may include input devices such as microphones, motion sensors, and so forth. Continuing the example, the motion sensors may include, but are not limited to, accelerometers, gyroscopes, magnetometers, cameras, and so forth.

The wearable device may include input devices such as proximity sensors, touch sensors, buttons, and so forth. For example, the wearable device may include a one dimensional or linear touch sensor that the user may run their finger along to select a particular function accessible. Data indicative of selection of the particular function may be provided by way of an audible output, visual output by way of one or more display lights, and so forth. In another example, the wearable device may include a mute button to silence audio output from one or more speakers.

The head-mounted wearable device may include output devices such as display lights, speakers, and so forth. In the form factor of a pair of glasses, one or more display lights may be fitted on or around the lenses such that light emitted by a display light is at least partially within the field of vision of the wearer when activated. Output from the output devices may be used to provide a user with information about operation. For example, the color and location of a display light that is illuminated may be used to indicate communication is in progress with a particular recipient.

The user may send, receive, or send and receive information to the wearable device using audio signals, such as speech or other noises. For example, sound data acquired by the microphone on the wearable device may be processed to determine verbal input, speakers may be used to present audible output, and display lights may be illuminated to denote a particular selection or mode of operation.

In some implementations, the wearable device may be in communication with a user device. The user device may comprise another computing device, such as a smart phone, tablet, set-top box, laptop computer, and so forth. A wireless communication link between the wearable device and the user device allows for the wireless transfer of data. For example, the communication link may utilize a Bluetooth protocol. In other implementations, the wearable device may comprise a standalone device.

The system provides for a variety of different modes of communication. In one implementation, a "conversation companion" mode allows for user to readily communicate with other resources, such as other users or services. The wearable device, the user device, a service executing on the one or more servers, or combination thereof may be configured to initiate particular actions based at least in part on the position or movement of the user's head. For example, the user may turn their head to the left, turn their head to the right, or maintain it straight ahead. By using motion data from the motion sensors, a gesture such as the user turning their head, may be determined.

A particular direction, relative to the user, may be associated with a particular recipient. For example, turning the head to the left may be associated with the user "Catherine", while turning the head to the right is associated with the user "Frank". By turning their head one direction or another, the user may initiate communication with the person associated with that gesture. In some situations, action words may be used to initiate an action, such as recording a message for sending or closing down a telephone call. For example, the system may be configured so that the user needs to turn their head to the left and say "Hey Frank" in order to open communication with Frank.

The user may be provided with various output to provide feedback as to the activity of the system. For example, the display light on the right may glow green when a message is being recorded for recipient "Frank". Notification sound data may also be presented using the speakers to provide additional context to the user. For example, if Frank is a work contact for Abbott, when a message is being recorded for Frank, Abbott may hear audio such as a loop of office sounds. The notification sound data thus provides another cue to the user who is wearing the head-mounted wearable device as to whom a particular communication is addressed.

The output from the wearable device may be spatialized to reflect the relative position of a particular user. Continuing the example above, if Catherine is associated with turning the head left and Frank with turning the head right, messages from Catherine may be presented predominately in the left ear of the user while messages from Frank may be presented predominately in the right ear. Again, this provides additional context to the user wearing the wearable device as to who may be communicating with them.

The system may transition communications involving the user between synchronous and asynchronous modes. These communications may involve the wearer and a resource such as a service or one or more other users using other user devices. For example, a user may ask an automated system for assistance, or may communicate with a friend.

In some implementations, synchronous communication may include a live bidirectional audio connection such as voice telephony or voice over internet protocol (VOIP) communication, video chat, and so forth. The synchronous communication may be full duplex, in that both parties may speak and be heard by the other simultaneously. The synchronous communications may be described as real-time in that the parties involved in the communication may be able to spontaneously react with one another. During synchronous communication, service level standards may be set, such as maximum latency in audio delivery for VOIP.

In comparison, asynchronous communication may involve the transfer of discrete sets of message data, may not provoke or expect an immediate response, and so forth. In some implementations, asynchronous communications may include short message service (SMS) messages, text messages, email, audio clips, video clips, and so forth. Messages exchanged during an asynchronous communication may be in different formats, and may occur over longer time scales than synchronous communications. For example, the user may send a recorded audio clip to the recipient, and may receive back an SMS message.

By determining the gesture using the motion data, the system is able to determine which recipient to establish communication with. In one implementation, communication may default to an asynchronous mode. For example, the user Abbott may turn their head to the left to record an audio clip message for Catherine.

Once sent, the communication between Abbott and Catherine may vary of time between synchronous and asynchronous modes. For example, the first message to Catherine may be sent asynchronously. If Catherine responds within a threshold amount of time, such as within 5 seconds of presenting back the message from Abbott, synchronous communication may be established. If, during that conversation facilitated by the synchronous communication, nothing is said for a certain amount of time, no further gestures are received that are associated with the recipient, or other criteria obtained, the synchronous communication may be discontinued.

The ability to transition seamlessly between synchronous and asynchronous communication modes may also improve overall network efficiency. For example, rather than maintaining a bandwidth and latency-intensive VOIP call, the exchange of asynchronous communications may use less bandwidth on a network.

By using the techniques described in this disclosure, users may communicate with other resources, such as automated systems or other users in a seamless fashion. Gestures such as head turning may be used, as may be the use of action words or other recognized speech, to facilitate communication. Visual and audible cues may be provided to the user to provide unobtrusive information about how and with whom they are communicating. The system overall improves the ability for a user to communicate without requiring the user to direct their attention to a graphical user interface (GUI)

during normal use. Use of this system may improve efficiency of the user, may improve the safety of the user by avoiding the use of a GUI that may be distracting, and so forth.

Illustrative System

FIG. 1 depicts a system 100 in which a user 102 makes a gesture 104 while wearing on their head a head mounted wearable device (HMWD) 106 in a general form factor of eyeglasses. The HMWD 106 may include one or more input devices 108. For example, a transducer may be used in conjunction with the nosepiece to act as a bone conduction microphone or speaker. Vibrations from the speech of the user 102 may be transferred via the nosepiece to the transducer, and an audio signal may be produced. This audio signal may be subsequently used for issuing commands to a processor of the HMWD 106, communication with an external person or device, and so forth. The input devices 108 may include air conduction microphones instead of, or in addition to, the transducer.

The HMWD 106 may be implemented in other form factors as well. For example, the HMWD 106 may have a form factor similar to a hearing aid, headphones, hat, hair clip, dental appliance, jewelry, and so forth.

Other input devices 108 may include one or more motion sensors. The motion sensors may include one or more of an accelerometer, gyroscope, magnetometer, camera, and so forth. For example, the motion sensors may comprise an inertial measurement unit (IMU) that combines a multi-axis accelerometer and one or more gyroscopes to measure acceleration and rotation. The motion sensor(s) may generate motion data that is used to determine the occurrence of a gesture 104. For example, the occurrence of particular movements characterized by particular accelerations and rotations may be indicative of a gesture 104 where the user 102 has turned their head to the left. The input devices 108 are discussed in more detail below.

The HMWD 106 may include one or more output devices 110. The output devices 110 may include display lights, speakers, haptic output devices, and so forth. In the form factor of a pair of glasses, one or more display lights may be fitted on or around the lenses such that light emitted as a display light is at least partially within the field of vision of the wearer when activated. For example, one or more light emitting diodes (LED) may be arranged within a portion of a frame that supports the lenses, such that light is emitted toward the user's eyes. In one implementation, a single display light may be within the field of vision of one or both eyes, such as on a bridge of the glasses. In another arrangement, a plurality of display lights may be within the field of vision of one or both eyes. Output from the output devices 110 may be used to provide a user with information about operation. For example, the color and location of a display light that is illuminated may be used to indicate communication is in progress with a particular recipient.

The display lights may convey information based on their relative position in the field of view of the user 102, their color, their illumination pattern, and so forth. For example, a green light in a left edge of the user's 102 visual field may be associated with recipient "Catherine" while a green light in a right edge of the user's 102 visual field may be associated with recipient "Frank". In another example, the illumination pattern may result in the pulse or flash rate of the display light changing to indicate how long communication has been suspended. For example, if a synchronous communication has been placed on hold or muted, the display light may flash with increasing frequency or intensity as the wait time increases.

For audible output, the output devices 110 may include one or more speakers. The speakers may be air conduction or bone conduction speakers. For example, a bone conduction speaker may be designed to operate when in contact with the head of the user 102, such that sound vibrations are imparted into the skull without first travelling through the air. The speakers may be used to convey audible information such as speech, notification sounds, or other information.

The HMWD 106 may exchange data 112 using one or more networks 114 with one or more servers 116. For example, the data 112 may comprise digitized speech that is sent by the HMWD 106 or received by the HMWD 106. The servers 116 may support one or more services. These services may be automated, manual, or combination of automated and manual processes. For example, the services may include a virtual assistant that can respond to various inquiries or commands issued by the user 102.

By using the input devices 108 and the output devices 110, the HMWD 106 is able to facilitate communication 118. For example, as depicted here the gesture 104 of a left head turn by the user "Abbott" 102(1) is determined. Because the recipient "Catherine" has been previously associated with this gesture 104, the system begins recording an asynchronous audio message. Once the user 102(1) has finished speaking the recording may timeout, and be sent to the recipient "Catherine". Communication between Abbott and Catherine may then proceed without the need for clumsy and time-consuming interactions with other devices such as smartphones, tablets, desktop computers, and so forth.

The HMWD 106 may communicate with another device, such as a user device 120 such as a smartphone, tablet, television, home automation system, and so forth. For example, the HMWD 106 may use a personal area network (PAN) such as Bluetooth to communicate with the user device 120. In some implementations the user device 120 may act as a gateway, providing connectivity or other functionality between the HMWD 106 and the network 114.

Figure 2:
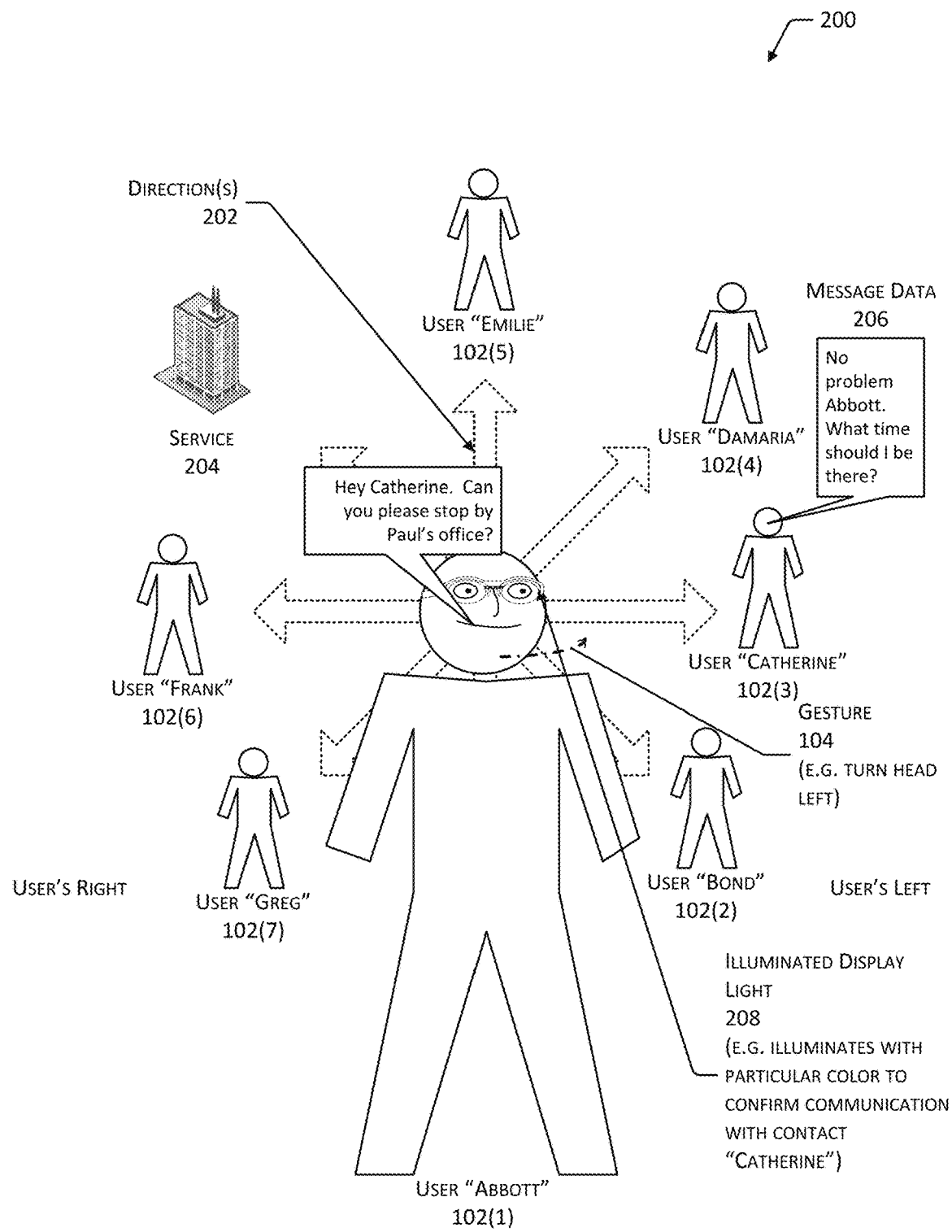
FIG. 2 depicts the ability of the user to initiate communication with another user with a gesture, such as turning their head in a particular direction, according to some implementations.

FIG. 2 depicts a scenario 200 of the ability of the user 102 to initiate an action such as communication with another user, according to some implementations. In the scenario 200 illustrated here, the user 102 may point their head in one of eight discrete directions 202. Each of the different directions 202 may be associated with a particular resource. For example, the direction 202 corresponding to the user's 102 upper right is established as communication with the service 204. In another implementation, the direction 202 straight ahead may be associated with the service 204. The service 204 may comprise an automated service, manual service, or combination of automated and manual services. For example, the service 204 may comprise an online merchant, library, entertainment database, and so forth. In some implementations the service 204 may pass data obtained at least in part using the HMWD 106 to a third-party service.

The HMWD 106 may be used to access other resources, such as content. For example, the user 102 may listen to audiobooks, music, television shows, movies, and so forth with the HMWD 106.

As depicted here, the user Abbott 102(1) performs a gesture 104 by turning his head up to his left, to a direction that is associated with user "Catherine" 102(3). One or more of the display lights may be illuminated 208 to confirm the selection of Catherine 102(3). For example, the display light in the upper left corner may change illuminated display light 208 to green, that being the color previously associated with user Catherine 102(3). Responsive to the positioning of the head, message data 206 may be exchanged between the two users 102. For example, the audio acquired by the microphone of the HMWD 106 that is spoken by user Abbott 102(1) may be acquired and transmitted to the user Catherine 102(3). In some implementations, an action phrase, wake word, or keyword may be used in conjunction with the direction of the head. For example, to initiate communication with user Catherine 102(3), the user Abbott 102(1) may need to say the word "Hey" to initiate communication. Likewise, to access the service 204, the user Abbott 102(1) may turn his head up and to the right and say "service".

In some implementations, the communication with a resource may be synchronous. For example, user Abbott 102(1) and user Catherine 102(3) may engage in a real-time conversation, such as with a VOIP call or telephone call. In other implementations, the communication may be asynchronous. For example, a snippet of audio acquired by the user Abbott 102(1) may be stored and provided as message data 206 to the user Catherine 102(3) at a later time. User Catherine 102(3) may then reply at a later time either as another voice snippet, as a text message, in some other format, or as a synchronous communication.

In some implementations, instead of or in addition to turning a particular direction, other gestures 104 may be used to select resources or other functions by way of the HMWD 106. For example, the user 102 may use their finger on a touch input sensor of the HMWD 106 to select a particular resource. In another example, other changes in direction or motions by the HMWD 106 may be associated with particular actions. For example, the user 102 shaking their head "no" may cancel a pending function or terminate an existing function.

While eight directions 202 are depicted, it is understood that in other implementations more or less directions 202 may be specified. For example, only three directions 202 may be specified such as left, front center, and right. In some implementations, the number of directions 202 in addition to the functions associated therewith may be specified by the user 102.

Figure 3:
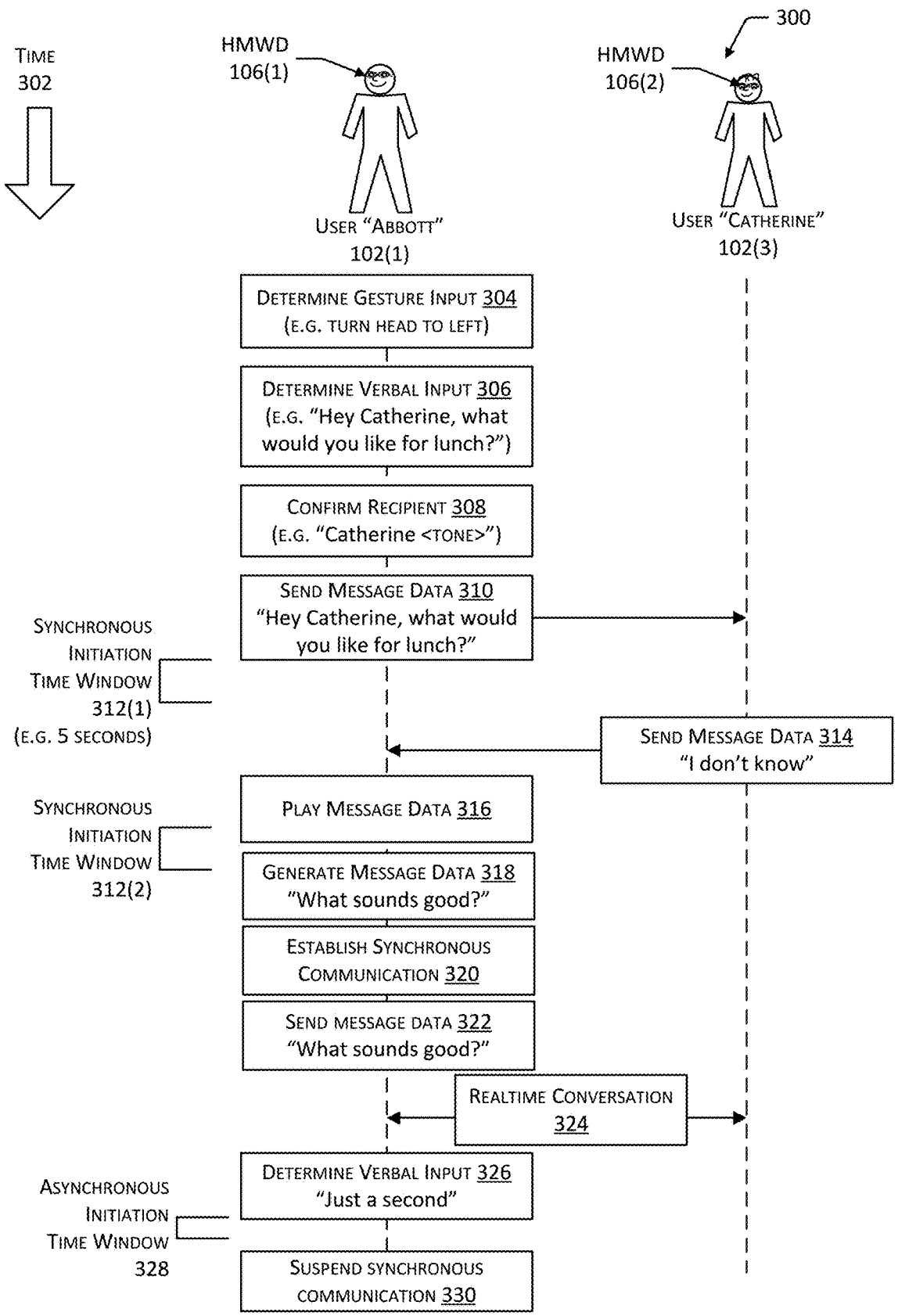
FIG. 3 depicts a scenario in which gesture input is used to select a recipient for a communication, according to some implementations.

FIG. 3 depicts a scenario 300 in which gesture input is used to select a recipient for a communication, according to some implementations. In this scenario, user Abbott 102(1) has a first HMWD 106(1) while user Catherine 102(3) has a second HMWD 106(2). These devices are able to communicate with one another either directly, via the network 114, or other intermediate devices. In this illustration, time 302 increases down the page.

At 304 the system determines gesture input at the first HMWD 106(1). For example, a gesture 104 such as the user Abbott 102(1) turning his head to the left is determined.

At 306 the system determines verbal input 306 at the first HMWD 106(1). For example, the first HMWD 106(1) may recognize a wake word or action phrase of "Hey" that is associated with opening communication with another user.

In some implementations, output may be presented to the user Abbott 102(1) during the acquisition of data for the communication. For example, a notification sound data file of office sounds may be presented to the user Abbott 102(1) to provide a subtle audible queue to Abbott that he is engaging in communication with Catherine with whom he works. In another example, a display light may be illuminated display light 208, such as a red light indicating that audio is currently being acquired from a microphone.

At 308 the system confirms a recipient at the first HMWD 106(1). The confirmation may use one or more of the output devices 110. For example, a notification sound data file may be played to the user Abbott 102(1), a display light may be illuminated display light 208, and so forth. Continuing the example, the display light may blink green when Catherine is designated as the recipient. As illustrated here, the recipient may be confirmed by saying the recipient's name and presenting a brief sound.

At 310 the system sends message data 310 to the second HMWD 106(2). The second HMWD 106(2) may present a message data to the user Catherine 102(3). For ease of illustration, and not necessarily as a limitation, some of the operations of the second HMWD 106(2) have been omitted from this figure.

The system may utilize time windows that specify a threshold value of elapsed time to determine when to transition between synchronous and asynchronous modes. In this scenario, the synchronous initiation time window 312 having a duration of five seconds begins after the send message data 310. In some implementations the synchronous initiation time window 312 may be measured from one or more of the time of acquisition of the message data, time of transmission of the message data, time that presentation of the message data started, time that the presentation of the message data concluded, and so forth. For example, the synchronous initiation time window 312 may have a value of five seconds measured from conclusion of playback of the message data. In the scenario depicted here, the second HMWD 106(2) sends message data 314 with the content "I don't know" to the first HMWD 106(1), but this occurs after the expiration of the first synchronous initiation time window 312(1). As a result, communication remains asynchronous.

The first HMWD 106(1) plays the message data 316, so the user Abbott 102(1) hears the audio of Catherine saying "I don't know". In some implementations, playback of audio may be associated with a particular side corresponding to the gesture 104 associated with recipient. For example, audio sent by Catherine may be played back using predominantly the speakers on the left of the first HMWD 106(1). This provides a consistent spatial association between the gesture 104 to establish communication with user Catherine 102(3) and messages received from user Catherine 102(3). The apparent relative position of audio with respect to the head of the user 102 of the audio being presented may be performed using one or more techniques. For example, the amplitude of the audio output presented by the speakers on the left may be greater than the amplitude of the audio output presented by the speakers on the right. Thus, the sound would appear to the user 102 to be coming from the left. In other implementations, other techniques to provide two or three-dimensional audio effects may be used. For example, head-related transfer functions may be used to modify an audio signal prior to playback to provide an apparent direction of a sound.

After the first user Abbott 102(1) hears the playback of the message from Catherine at 316, he generates message data 318 by recording an audio clip of "What sounds good?" A second synchronous initiation time window 312(2) begins when playback of the message data is concluded.

Because the generation of this message data began within the second synchronous initiation time window 312(2), instead of sending a message data as part of an asynchronous communication, at 320 synchronous communication is established. The synchronous communication may comprise a live bidirectional real-time (or near real-time) exchange of information. The synchronous communication may be full duplex, in that both parties may speak and be heard by the other simultaneously. The synchronous communication may utilize one or more technologies, including but not limited to the public switched telephone network (PSTN), session initiation protocol (SIP), session description protocol (SDP), real-time transport protocol (RTP), secure RTP (SRTP), RTP control protocol (RTCP), H.323 protocols as promulgated by the UTI Telecommunication Standardization Sector, and so forth. In other implementations other audio or videoconferencing technologies may be used, such as $3^{rd}$ party internet protocol (IP) based protocols, private branch exchanges (PBXs), trunk lines, private lines, and so forth. For example, during establishment of a synchronous communication, a line on the PSTN may be accessed, and a telephone number dialed. In another example, during a VOIP call, a request including destination address information may be sent to a first gateway device. The first gateway device may establish a connection with a second gateway device that is associated with the destination address. A logical channel may be opened between the HMWD 106 and a destination device associated with the destination address. A first RTP stream may be initiated from the HMWD 106 to the destination device transferring first audio data, while a second RTP stream is initiated from the destination device to the HMWD 106 transferring second audio data.

During operation, any of the communication modes may utilize various technologies including session traversal utilities for network address translation (STUN), traversal using relays around network address translation (TURN), and so forth. For example, the use of STUN and TURN allow for establishment of communication between devices on different networks in which network address translation is occurring at interconnections between those different networks. The communication modes may utilize an intermediate device, such as one or more gateways, servers, media controllers, and so forth. In other implementations, the communication modes may involve peer-to-peer distribution of data between the HMWD 106 and one or more other devices.

The synchronous communications may be described as real-time (or near real time) in that the parties involved in the communication may be able to spontaneously interact with one another. For example, the first HMWD 106(1) may initiate a VOIP call to the second HMWD 106(2). In some implementations, the synchronous communication may be automatically enabled without the recipient expressly having to accept an incoming call. However, the recipient's outgoing audio may be muted until they engage in a particular gesture 104, utter a specific action phrase, and so forth. Continuing this example, the VOIP call may be established. Once established, the system sends message data 322 comprising a previously recorded audio data of user Abbott 102(1) saying "What sounds good?" After this audio has been presented to the recipient, real-time conversation 324 may commence using the synchronous communication mode. As mentioned above, the incoming synchronous communication may be accepted without intervention by the recipient, but an affirmative gesture 104 or other input may be necessary to permit the acquisition or transmission of audio, video, or other data from the second HMWD 106(2) of the recipient to the first HMWD 106(1).

As a real-time conversation 324 continues, the system may determine verbal input 326 obtained from the first HMWD 106(1). For example the user Abbott 102(1) may say "Just a second". The phrase "just a second" may be designated as an action phrase that, within the context of synchronous communication, discontinues the synchronous communication. In some implementations, the discontinuance may be temporary, such as by muting or otherwise preventing the acquisition or transmission of audio from the first HMWD 106(1). An asynchronous initiation time window 328 may be used similar to the synchronous initiation time window 312 described above. However, an asynchronous initiation time window 328 specifies an interval of time after which synchronous communication is discontinued and the communication resumes in asynchronous communication mode.

As illustrated here, following the determination of the verbal input 326 of "Just a second" and the suspension of the real-time conversation 324, no further communication takes place within the time window specified by the asynchronous initiation time window 328. As a result, synchronous communication is suspended 330. Had there been some message data exchanged within the asynchronous initiation time window 328, the system would have remained within the synchronous communication mode.

While the above example has been described using to HMWD's 106, it is understood that the interactions may be between a HMWD and another user device 120, such as a smart phone, tablet, personal computer, and so forth.

The transition between synchronous communication mode and asynchronous communication mode may also be responsive to explicit gestures 104, action phrases, and so forth performed by the user 102. For example, returning to 314 above, if Catherine had performed the gesture 104 of turning her head to the direction associated with the user Abbott 102(1) on her second HMWD 106(2) and responding "Hey Abbott, I don't know", the combination of the gesture 104 and the action phrase of "Hey" may have resulted in the immediate establishment of synchronous communication between the first HMWD 106(1) and the second HMWD 106(2).

While the examples above illustrate the use of the action phrase "Hey", other the action phrases, wake words, and so forth may be used. The action phrase may comprise a single word, multiple words, phoneme, non-lexical vocables, and so forth.

Instead of or in addition to the gestures 104 or the verbal inputs, other input such as input obtained from other input devices 108 such as touch sensors or buttons on the HMWD 106 may also be used as inputs to control the transition between communication modes. For example, a touch to a touch sensor on the HMWD 106 of a recipient may be required to establish synchronous communication.

Figure 4:
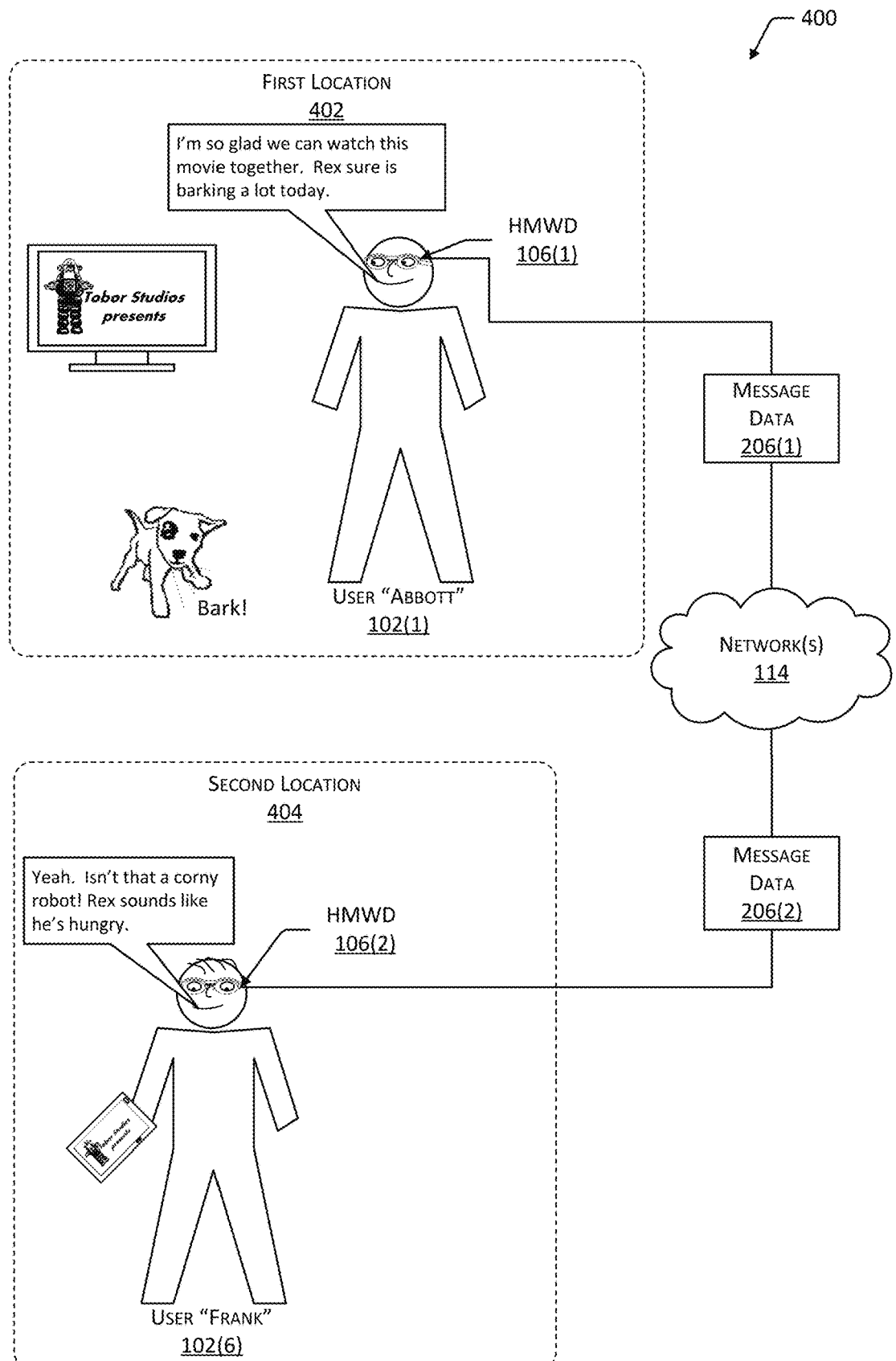
FIG. 4 depicts the system providing a real-time audio environment wherein two or more listeners may speak to one another and also hear sounds from the other participants' environment, according to some implementations.

FIG. 4 depicts a scenario 400 in which the system provides a real-time audio environment wherein two or more listeners may speak to one another and also hear sounds from the other participants' environment, according to some implementations.

To further facilitate seamless communication, the system may allow for a shared audio space in which users 102 are able to hear one another as well as sounds in the environment of their respective locations.

In this scenario 400, the user Abbott 102(1) and user Frank 102(6) are utilizing a "conversation companion" mode. While in this mode, the audio acquired at one or more microphones of the wearable device of user 102 may be provided to another wearable device and rendered as output from one or more speakers. In the scenario depicted, the user Abbott 102(1) is located at a first location 402, such as his home while user Frank 102(6) is located at a second location 404 in another city. The two users 102 are watching the same movie at the same time, and are able to converse naturally with one another.

In some implementations, the message data 206 provided to the other party in this mode may include sounds from the ambient environment. For example, user Abbott 102(1) may allow for environmental sounds obtained by air conduction microphones on the first HMWD 106(1) to be sent to the second HMWD 106(2) of user Frank 102(6), allowing user Frank 102(6) to hear user Abbot's 102(1) dog Rex barking. Likewise, user Frank 102(6) may allow environmental sounds obtained by air conduction microphones on the second HMWD 106(2) to be sent to the first HMWD 106(1).

Different levels of amplification or attenuation may be associated with the source of audio. For example, to the recipient, sound from the bone conduction microphone or transducer used to acquire speech audio may be louder than sound from the one or more environment microphones, or vice versa.

Figure 5:
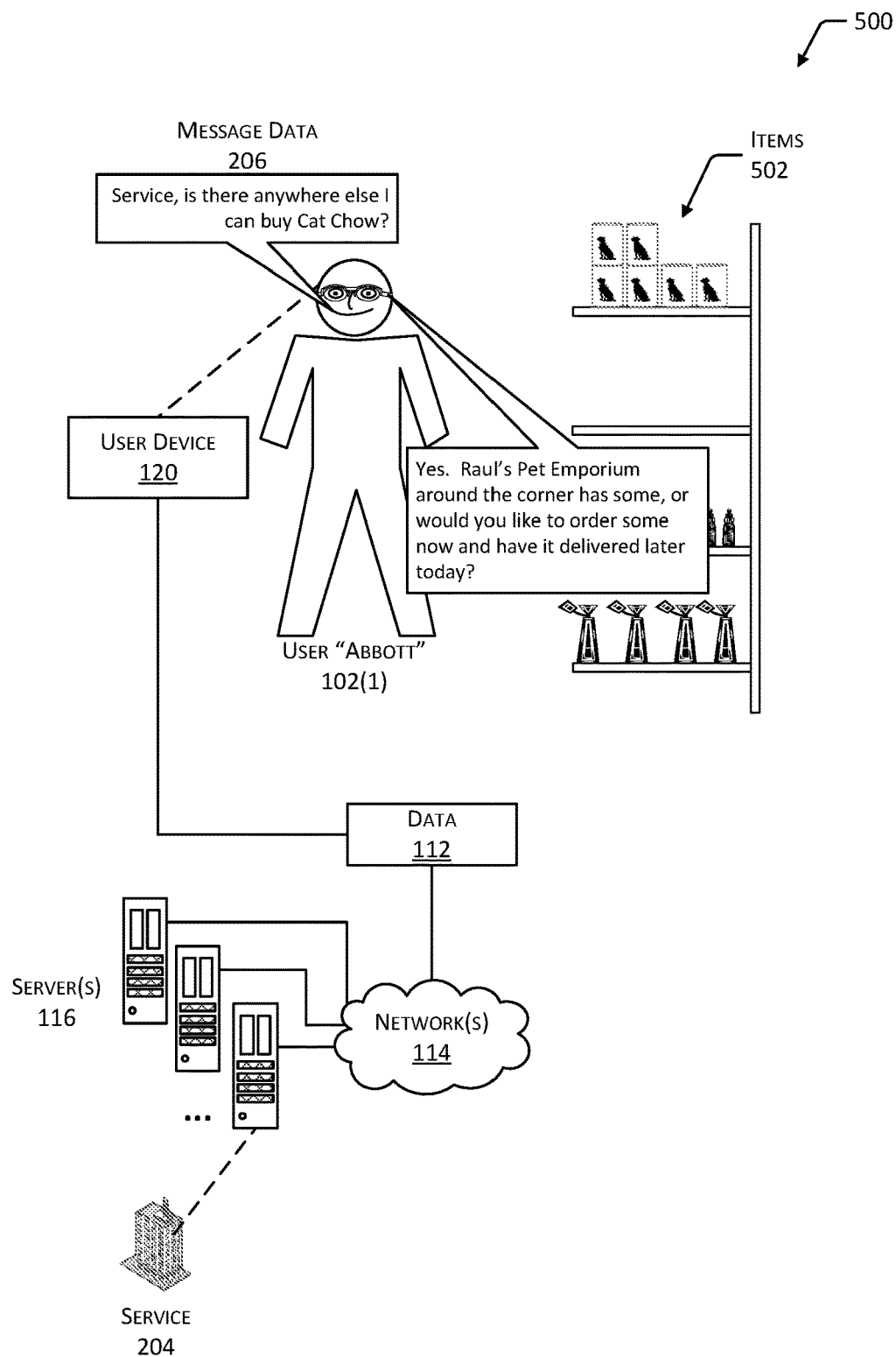
FIG. 5 depicts the user interacting with a service to obtain information, according to some implementations.

FIG. 5 depicts a scenario 500 in which the user Abbott 102(1) is interacting with a service 204 to obtain information, according to some implementations. In this scenario, the user Abbott 102(1) is out shopping for some cat chow but discovers that his corner store only stocks items 502 such as dog food. While standing there in the store, the user Abbott 102(1) performs the gesture 104 of turning his head up and to the right to have the HMWD 106 initiate communication with the resource of the service 204. Abbott may then speak his request to find someplace else to buy cat chow. This request is then responded to by the service 204. The information provided may then be output to the user Abbott 102(1) using the output devices 110 to direct him elsewhere or offer the desired item 502 for purchase and later fulfillment.

In other implementations, the service 204 may provide other information such as availability of entertainment, directions to a particular location, and so forth. For example, the user 102 may be a medical professional and may use the HMWD 106 to ask for specific information about how to handle a certain drug interaction.

The service 204 may utilize at least in part human operators. For example, human operators may provide responses via a user interface provided by a computing device. These responses may be presented to the user 102. Where the responses are textual, a text-to-speech system may be used to provide audible output. In other implementations, a real-time communication mode may be established between the user 102 and a human representative of the service 204.

Figure 6:
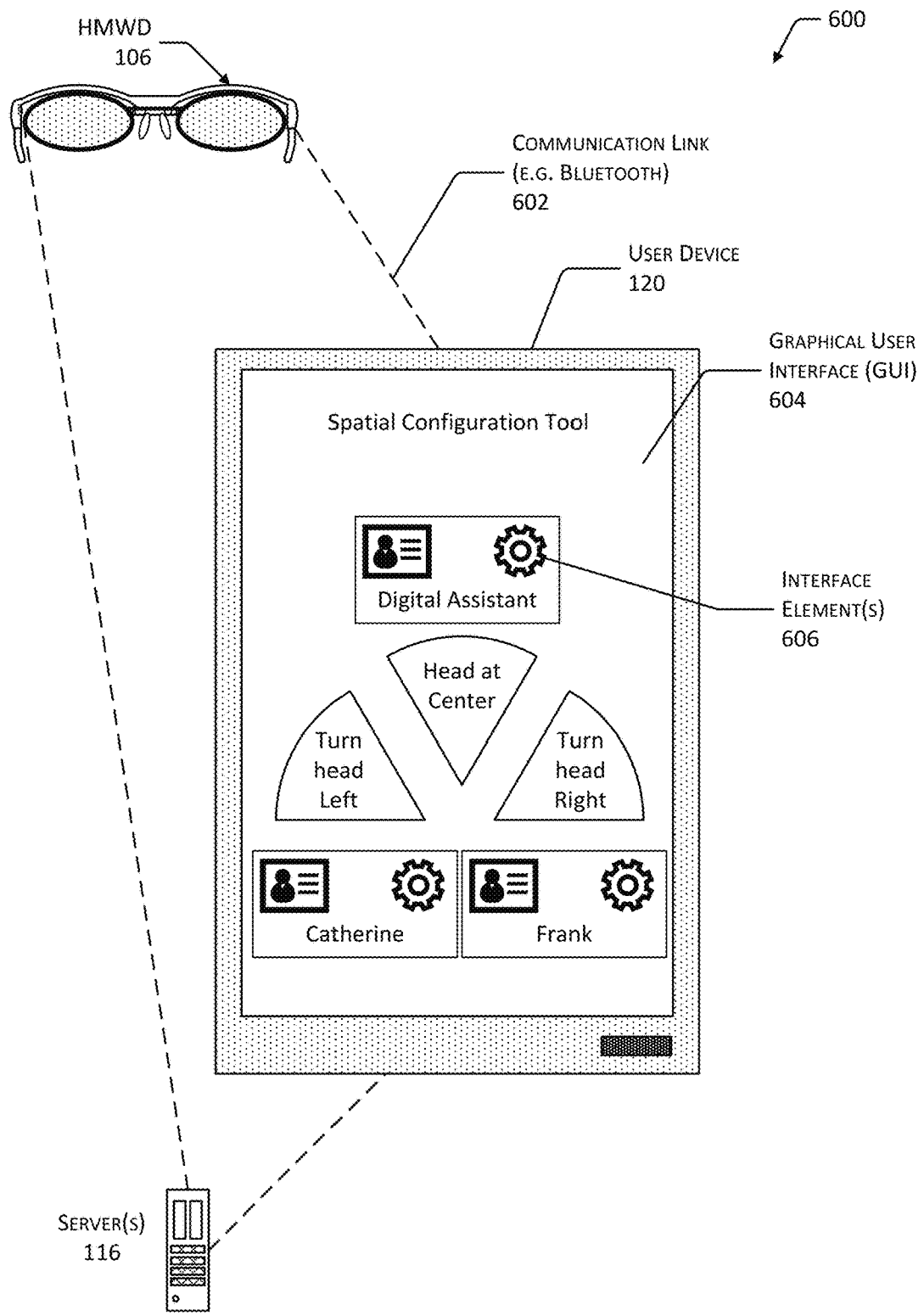
FIG. 6 depicts a user device that may be used in conjunction with the head-mounted wearable device, according to some implementations.

FIG. 6 depicts the user device 120 that may be used in conjunction with the HMWD 106, according to some implementations. In some implementations, it may be more convenient for the user 102 to view particular information, make configuration changes, specify recipient details, and so forth using a graphical user interface (GUI). A user device 120 may be associated with a particular HMWD 106. For example, the user device 120 and the HMWD 106 may be paired to establish a communication link 602. The communication link 602 may utilize Bluetooth, Wi-Fi, or other communication technologies.

The association between the devices may be stored at server 116. For example, the user 102 may login to the HMWD 106 by providing login credentials for a particular user account. Continuing the example, the user 102 may then login to the user device 120 by providing login credentials that are associated with the same particular user account. By logging in using credentials that associate with the same user account, the user device 120 may be associated with HMWD 106.

The user device 120 may be used to present a graphical user interface (GUI) 604. The GUI 604 may include one or more interface elements 606. The interface elements 606 may comprise graphical user elements such as controls, buttons, sliders, combo boxes, list boxes, radio buttons, and so forth.

As depicted in FIG. 6, the GUI 604 illustrates a spatial configuration tool that presents the current spatial association that designates a particular recipient with a particular direction 202 of a gesture 104. For example, the user Catherine 102(3) is associated with a left head turn, the center is associated with a digital assistant service 204, and the user Frank 102(6) is associated with a right head turn. The user Abbott 102(1) may use the GUI 604 to make changes to this configuration. In other implementations, other information, functions, or combinations thereof may be presented within the GUI 604. For example, a contact management GUI may be presented that allows for the addition, editing, or removal of users from an address book.

The spatial configuration of particular recipients with particular gestures 104 may also be performed verbally using the HMWD 106. For example, without using the GUI 604 the user Abbott 102(1) may perform a gesture 104, under a particular action phrase, and designate a new recipient to be associated with that gesture 104.

In any of the modes of operation above, in some implementations output may be directed to the user device 120 rather than the HMWD 106. For example, the user 102 may request written output to be presented on their tablet or smartphone. Likewise, output designated for representation by the user device 120 may be redirected to the HMWD 106. For example, text being presented on the user device 120 may be converted to speech and presented by way of the speakers on the HMWD 106 to the user 102.

Figure 7:
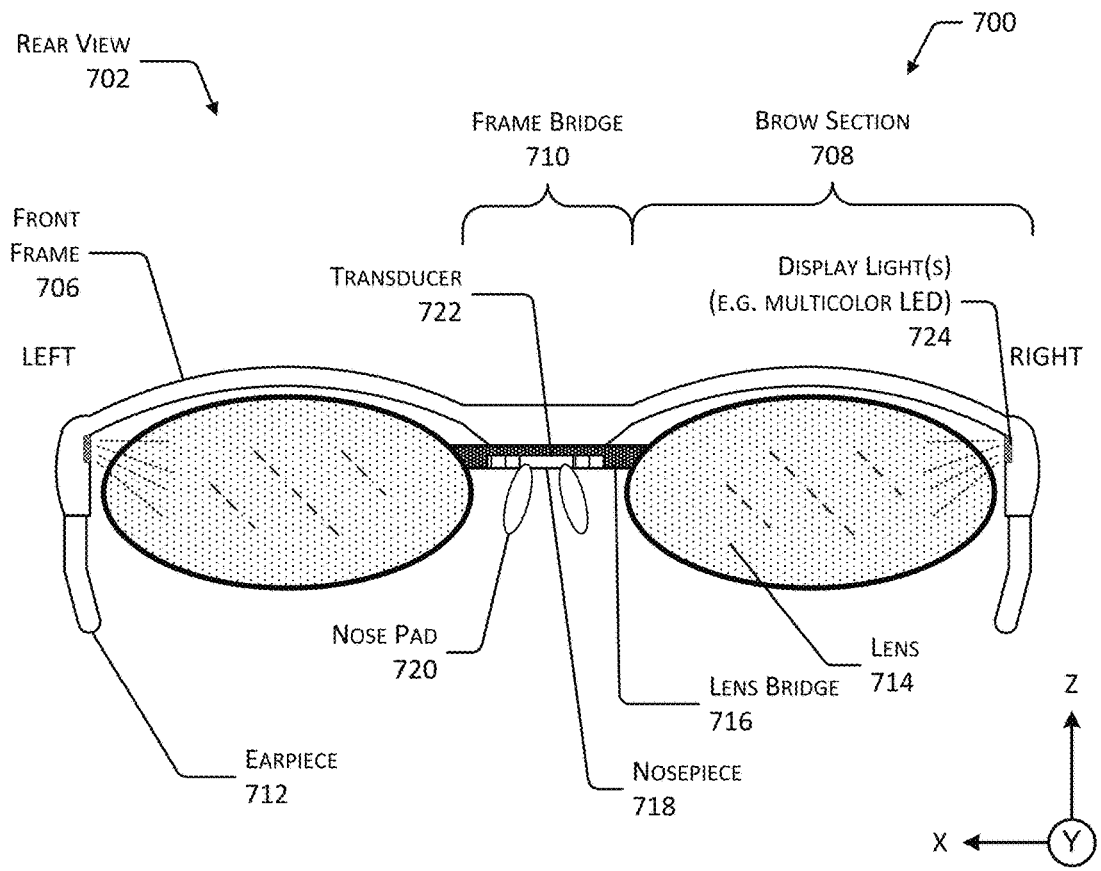
FIG. 7 depicts a rear view and an underside view of the head-mounted wearable device, according to some implementations.
Figure 7:
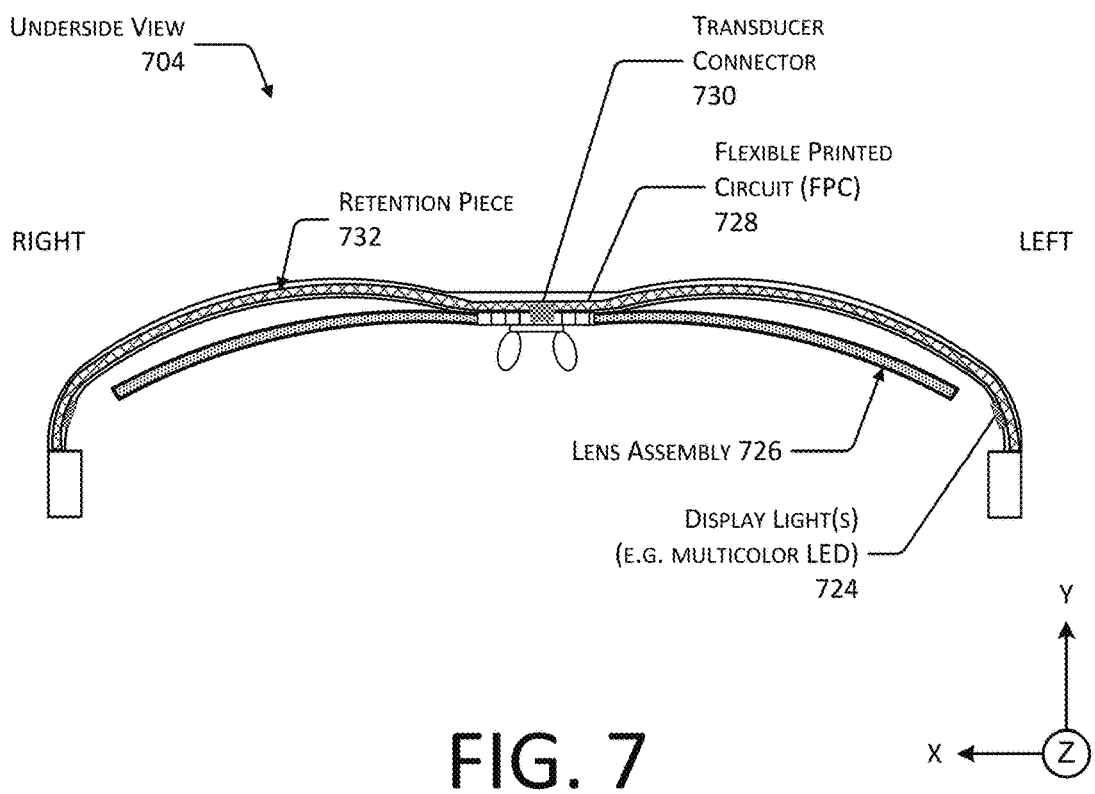

FIG. 7 depicts two views 700 of the HMWD 106, according to some implementations. A rear view 702 shows the exterior appearance of the HMWD 106 while an underside view 704 shows selected components of the HMWD 106.

In the rear view 702, a front frame 706 is depicted. The front frame 706 may include a left brow section 708(L) and a right brow section 708(R) that are joined by a frame bridge 710. In some implementations, the front frame 706 may comprise a single piece of material, such as a metal, plastic, ceramic, composite material, and so forth. For example, the front frame 706 may comprise 6061 aluminum alloy that has been milled to the desired shape. In other implementations, the front frame 706 may comprise several discrete pieces that are joined together by way of mechanical engagement features, welding, adhesive, and so forth. Also depicted extending from temples or otherwise hidden from view are earpieces 712.

In some implementations, the HMWD 106 may include one or more lenses 714. The lenses 714 may have specific refractive characteristics, such as in the case of prescription lenses. The lenses 714 may be clear, tinted, photochromic, electrochromic, and so forth. For example, the lenses 714 may comprise plano (non-prescription) tinted lenses to provide protection from the sun. The lenses 714 may be joined to each other or to a portion of the frame bridge 710 by way of a lens bridge 716. The lens bridge 716 may be located between the left lens 714 (L) and the right lens 714(R). For example, the lens bridge 716 may comprise a member that joins a left lens 714 (L) and a right lens 714 (R) and affixes to the frame bridge 710. The nosepiece 718 may be affixed to one or more of the front frame 706, the frame bridge 710, the lens bridge 716, or the lenses 714. The transducer 722 may be arranged at a mechanical interface between the nosepiece 718 and the front frame 706, the frame bridge 710, the lens bridge 716, or the lenses 714.

The transducer 722 may be used as a bone conduction microphone in some implementations. The transducer 722 may comprise a device that is able to generate output indicative of audio frequency vibrations having frequencies occurring between about 10 hertz (Hz) and at least 22 kilohertz (kHz). In some implementations the transducer 722 may be sensitive to a particular band of audio frequencies within this range. For example, the transducer 722 may be sensitive from 100 Hz to 4 kHz. In one implementation the transducer 722 may comprise an accelerometer. For example, the transducer 722 may comprise a piezo-ceramic accelerometer in the BU product family as produced by Knowles Corporation of Itasca, Ill. Continuing the example, the Knowles BU-23842 vibration transducer provides an analog output signal that may be processed as would the analog output from a conventional air conduction microphone. The accelerometer may utilize piezoelectric elements, microelectromechanical elements, optical elements, capacitive elements, and so forth. The accelerometer may also be used to generate motion data in some implementations.

In another implementation the transducer 722 comprises a piezoelectric transducer that uses piezoelectric material to generate an electronic signal responsive to the deflection of the transducer 722. For example, the transducer 722 may comprise a piezoelectric bar device supported by two or more support posts.

In yet another implementation, the transducer 722 may comprise electromagnetic coils, an armature, and so forth. For example, the transducer 722 may comprise a variation on the balanced electromagnetic separation transducer (BEST) as proposed by Bo E. V. Hakansson of the Chalmers University of Technology in Sweden that is configured to detect vibration.

The transducer 722 may detect vibrations using other mechanisms. For example, a force sensitive resistor may be used to detect the vibration. In another example the transducer 722 may measure changes in electrical capacitance to detect the vibrations.

The transducer 722 may include or be connected to circuitry that generates or amplifies the output from the transducer 722. For example, the accelerometer may produce an analog signal as the output. This analog signal may be provided to an analog to digital converter (ADC). The ADC measures an analog waveform and generates an output of digital data. A processor may subsequently process the digital data.

In some implementations the transducer 722 may be optical rather than electronic. For example, the transducer 722 may comprise an optical strain gauge or vibration sensing element such as an optical fiber that is affixed to or embedded with another material, such as a support member, pad arms, and so forth. Deflection of the optical fiber by impinging vibration may result in changes in phase, intensity, polarization, and so forth that may be detected optically to generate an output signal. At least a portion of the optical elements may be mounted to another structure such as the front frame 706, embedded within another structure, concealed beneath a housing or cover layer, and so forth.

One or more display lights 724 may be arranged within a field of vision of the user 102 during normal wear. In the form factor of a pair of glasses depicted here, one or more display lights 724 may be fitted on or around the lenses 714 such that light emitted as a display light 724 is at least partially within the field of vision of the wearer when activated. For example, one or more light emitting diodes (LED) may be arranged within a portion of the front frame 706, such that light is emitted toward the user's eyes. In one implementation, a single display light 724 may be within the field of vision of one or both eyes, such as on the frame bridge 710. In another arrangement, a plurality of display lights 724 may be within the field of vision of one or both eyes. Output from the output devices may be used to provide the user 102 with information about operation. For example, the color, location, illumination pattern, intensity, and so forth of the display light 724 that is illuminated may be used to indicate various information such as communication in progress with a particular recipient. The display lights 724 may comprise one or more of LED, quantum dot, electroluminescent element, and so forth. The display lights 724 may provide output on one or more colors, and may be configurable to illuminate at different colors. For example, an LED may be designed to emit green, red, or blue light. In some implementations, light produced by the display light 724 may be indirectly visible to the user 102 wearing the HMWD 106. For example, the light may be reflected from a portion of the lens 714 into the field of view of the user 102 wearing the HMWD 106.

One or more nose pads 720 may be attached to the nosepiece 718. The nose pads 720 aid in the support of the front frame 706 and may improve comfort of the user 102. A lens assembly 726 comprises the lenses 714 and the lens bridge 716. In some implementations, the lens assembly 726 may be omitted from the HMWD 106.

The underside view 704 depicts the front frame 706. One or more electrical conductors, optical fibers, transmission lines, and so forth may be used to connect various components of the HMWD 106. In this illustration, arranged within a channel (not shown) is a flexible printed circuit (FPC) 728. The FPC 728 allows for an exchange of signals, power, and so forth between devices in the HMWD 106, such as the transducer 722, the left, and the right side of the front frame 706. For example, the FPC 728 may be used to provide connections for electrical power and data communications between electronics in one or both of the temples and the transducer 722.

In some implementations, the FPC 728 may be substantially planar or flat. The FPC 728 may include one or more of electrical conductors, optical waveguides, radiofrequency waveguides, and so forth. For example, the FPC 728 may include copper traces to convey electrical power or signals, optical fibers to act as optical waveguides and convey light, radiofrequency waveguides to convey radio signals, and so forth. In one implementation, the FPC 728 may comprise a flexible flat cable in which a plurality of conductors is arranged such that they have a substantially linear cross-section overall.

The FPC 728 may be planar in that the FPC 728 has a substantially linear or rectangular cross-section. For example, the electrical conductors or other elements of the FPC 728 may be within a common plane, such as during fabrication, and may be subsequently bent, rolled, or otherwise flexed.

The FPC 728 may comprise one or more conductors placed on an insulator. For example, the FPC 728 may comprise electrically conductive ink that has been printed onto a plastic substrate. Conductors used with the FPC 728 may include, but are not limited to, rolled annealed copper, electro deposited copper, aluminum, carbon, silver ink, austenite nickel-chromium alloy, copper-nickel alloy, and so forth. Insulators may include, but are not limited to, polyimide, polyester, screen printed dielectric, and so forth. In one implementation, the FPC 728 may comprise a plurality of electrical conductors laminated to a polyethylene terephthalate film (PET) substrate. In another implementation, the FPC 728 may comprise a plurality of conductors that are lithographically formed onto a polymer film. For example, photolithography may be used to catch or otherwise form copper pathways. In yet another implementation, the FPC 728 may comprise a plurality of conductors that have been printed or otherwise deposited onto a substrate that is substantially flexible.

The FPC 728 may be deemed to be flexible when it is able to withstand one or more of bending around a predefined radius or twisting or torsion at a predefined angle while remaining functional to the intended purpose and without permanent damage. Flexibility may be proportionate to the thickness of the material. For example, PET that is less than 750 micrometers thick may be deemed flexible, while the same PET having a thickness of 5 millimeters may be deemed inflexible.

The FPC 728 may include one or more layers of conductors. For example, one layer may comprise copper traces to carry electrical power and signals, a second layer may comprise optical fibers to carry light signals. A transducer connector 730 may provide electrical, optical, radio frequency, acoustic, or other connectivity between the transducer 722 and another device, such as the FPC 728. In some implementations the transducer connector 730 may comprise a section or extension of the FPC 728. In other implementations, the transducer connector 730 may comprise a discrete piece, such as wiring, conductive foam, flexible printed circuit, and so forth. The transducer connector 730 may be configured to transfer electrical power, electrical signals, optical signals, and so forth between the transducer 722 and devices, such as the FPC 728.

A retention piece 732 may be placed between the FPC 728 within the channel and the exterior environment. The retention piece 732 may comprise an overmolded component, a channel seal, a channel cover, and so forth. For example, the material comprising the retention piece 732 may be formed into the channel while in one or more of a powder, liquid or semi-liquid state. The material may subsequently harden into a solid or semi-solid shape. Hardening may occur as a result of time, application of heat, light, electric current, and so forth. In another example, the retention piece 732 may be affixed to the channel or a portion thereof using adhesive, pressure, and so forth. In yet another example, the retention piece 732 may be formed within the channel using an additive technique, such as using an extrusion head to deposit a plastic or resin within the channel, a laser to sinter a powdered material, and so forth. The FPC 728 may be maintained within the channel by the retention piece 732. The retention piece 732 may also provide protection from environmental contaminants such as dust, water, and so forth.

The retention piece 732 may be sized to retain the FPC 728 within the channel. The retention piece 732 may include one or more engagement features. The engagement features may be used to facilitate retention of the retention piece 732 within the channel of the front frame 706. For example, the distal ends of the retention piece 732 may include protrusions configured to engage a corresponding groove or receptacle within a portion of the front frame 706. Instead of, or in addition to the engagement features, an adhesive may be used to bond at least a portion of the retention piece 732 to at least a portion of the channel in the front frame 706.

The retention piece 732 may comprise a single material, or a combination of materials. The material may comprise one or more of an elastomer, a polymer, a ceramic, a metal, a composite material, and so forth. The material of the retention piece 732 may be rigid or elastomeric. For example, the retention piece 732 may comprise a metal or a resin. In implementations where the retention piece 732 is rigid, a retention feature such as a tab or slot may be used to maintain the retention piece 732 in place in the channel of the front frame 706. In another example, the retention piece 732 may comprise a silicone plastic, a room temperature vulcanizing rubber, or other elastomer.

The retention piece 732 may comprise a single piece, or several pieces. For example, the retention piece 732 may comprise a single piece produced using injection molding techniques. In some implementations, the retention piece 732 may comprise an overmolded piece.

One or more components of the HMWD 106 may comprise single unitary pieces or may comprise several discrete pieces. For example, the front frame 706, the nosepiece 718, and so forth may comprise a single piece, or may be constructed from several pieces joined or otherwise assembled.

In some implementations, the front frame 706 may be used to retain the lenses 714. For example, the front frame 706 may comprise a unitary piece or assembly that encompasses at least a portion of a perimeter of each lens.

Figure 8:
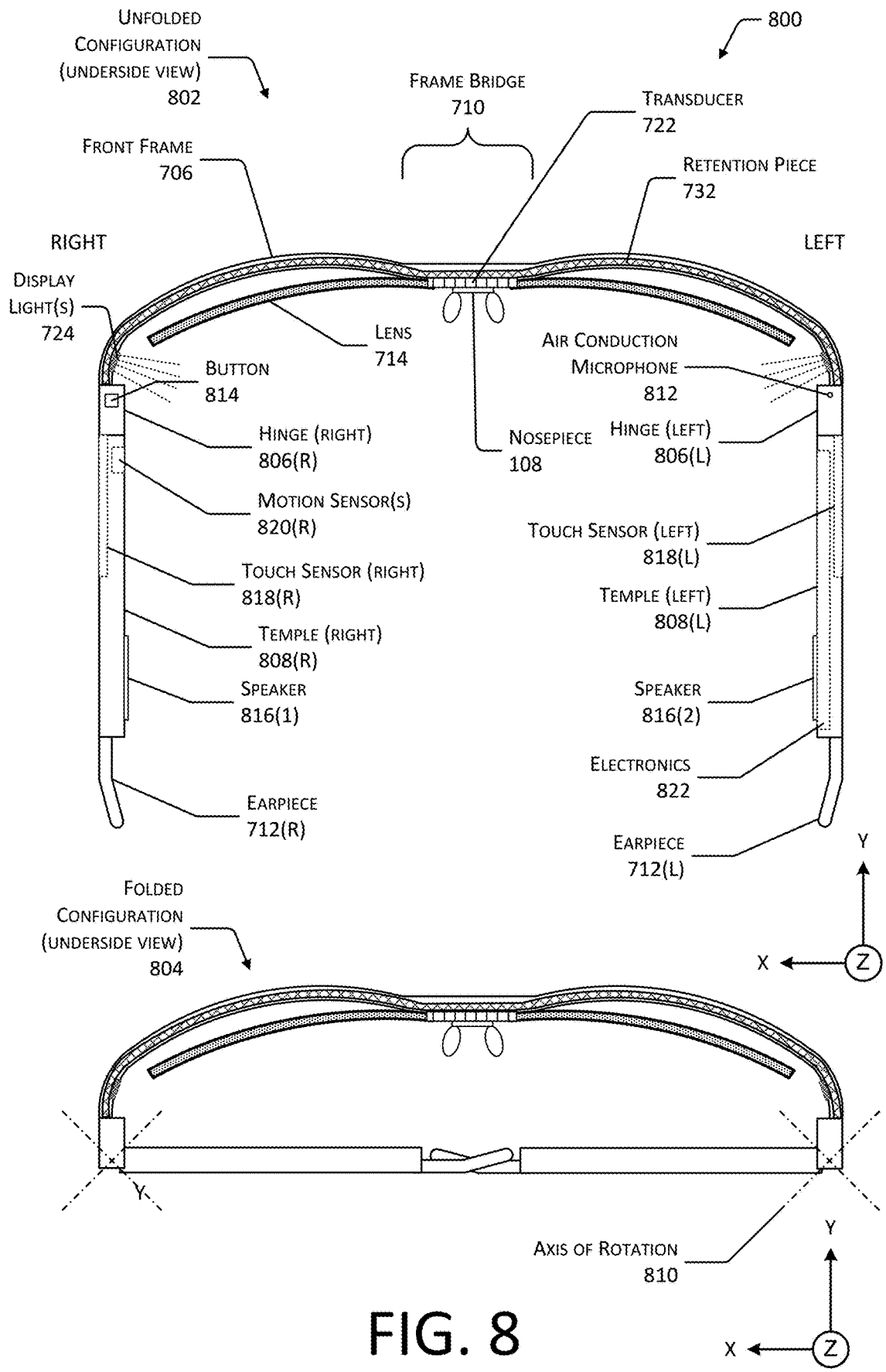
FIG. 8 depicts an exterior view, from below, of the head-mounted wearable device in unfolded and folded configurations, according to some implementations.

FIG. 8 depicts exterior views 800, from below looking up, of the HMWD 106, including a view in an unfolded configuration 802 and in a folded configuration 804, according to some implementations. The retention piece 732 that is placed within a channel of the front frame 706 is visible in this view from underneath the HMWD 106.

Also visible in this view are the lenses 714 of the lens assembly 726. Because the lens assembly 726 is affixed to the front frame 706 at the frame bridge 710, the front frame 706 may flex without affecting the positioning of the lenses 714 with respect to the eyes of the user 102. For example, when the head of the user 102 is relatively large, the front frame 706 may flex away from the user's head to accommodate the increased distance between the temples. Similarly, when the head of the user 102 is relatively small, the front frame 706 may flex towards the user's head to accommodate the decreased distance between the temples.

One or more hinges 806 may be affixed to, or an integral part of, the front frame 706. Depicted is a left hinge 806(L) and a right hinge 806(R) on the left and right sides of the front frame 706, respectively. The left hinge 806(L) is arranged at the left brow section 708(L), distal to the frame bridge 710. The right hinge 806(R) is arranged at the right brow section 708(R) distal to the frame bridge 710.

A temple 808 may couple to a portion of the hinge 806. For example, the temple 808 may comprise one or more components, such as a knuckle, that mechanically engage one or more corresponding structures on the hinge 806.

The left temple 808(L) is attached to the left hinge 806(L) of the front frame 706. The right temple 808(R) is attached to the right hinge 806(R) of the front frame 706.

The hinge 806 permits rotation of the temple 808 with respect to the hinge 806 about an axis of rotation 810. The hinge 806 may be configured to provide a desired angle of rotation. For example, the hinge 806 may allow for a rotation of between 0 and 120 degrees. As a result of this rotation, the HMWD 106 may be placed into a folded configuration, such as shown at 804. For example, each of the hinges 806 may rotate by about 90 degrees, such as depicted in the folded configuration 804.

One or more of the front frame 706, the hinge 806, or the temple 808 may be configured to dampen the transfer of vibrations between the front frame 706 and the temples 808. For example, the hinge 806 may incorporate vibration dampening structures or materials to attenuate the propagation of vibrations between the front frame 706 and the temples 808. These vibration dampening structures may include elastomeric materials, springs, and so forth. In another example, the portion of the temple 808 that connects to the hinge 806 may comprise an elastomeric material.

One or more different input devices 108 or sensors may be placed on the HMWD 106. For example, in addition to the transducer 722, air conduction microphones 812 may be emplaced within or proximate to the hinges 806, such as on the underside of the respective hinge 806. One or more buttons 814 may be placed in other locations on the HMWD 106. For example, a button 814(1) may be emplaced within, or proximate to, the right hinge 806(R), such as on an underside of the right hinge 806(R).

One or more speakers 816 may be emplaced on the temples 808. For example, as depicted here a speaker 816(1) may be located on the surface of the temple 808(R) that is proximate to the head of the user 102 during use. Continuing the example, as depicted here a speaker 816(2) may be located on the surface of the temple 808(L) that is proximate to the head of the user 102 during use. The speaker 816 may be configured to generate acoustic output. For example, the speaker 816 may comprise a speaker that provides audio to the user 102 via bone conduction through the temporal bone of the head.

Extending from a portion of the temple 808 that is distal to the front frame 706, is the earpiece 712. The earpiece 712 may comprise a material that may be reshaped to accommodate the anatomy of the head. For example, the earpiece 712 may comprise a thermoplastic that may be warmed to a predetermined temperature and reshaped. In another example, the earpiece 712 may comprise a wire that may be bent to fit. The wire may be encased in an elastomeric material.

The FPC 728 provides connectivity between the electronics in the temples. For example, the left temple 808(L) may include electronics such as a hardware processor while the right temple 808(R) may include electronics such as a battery. The FPC 728 provides a pathway for control signals from the hardware processor to the battery, may transfer electrical power from the battery to the hardware processor, and so forth. The FPC 728 may provide additional functions such as providing connectivity to the air conduction microphone 812, the button 814, components within the front frame 706, and so forth. For example, a front facing camera may be mounted within the frame bridge 710 and may be connected to the FPC 728 to provide image data to the hardware processor in the temple 808.

The HMWD 106 may also include one or more other input devices 108, such as touch sensors 818, motion sensors 820, and so forth. The motion sensors 820 may include, but are not limited to, accelerometers, gyroscopes, magnetometers, cameras, and so forth. For example, the motion sensors 820 may comprise an inertial measurement unit (IMU) that combines a multi-axis accelerometer and one or more gyroscopes to measure acceleration and rotation. In some implementations imaging sensors such as a camera may be used to detect motion by processing image data obtained by the sensor. For example, if a group of pixels shift from one position to another in sequential frames, the shift may be used to determine that movement of the camera has taken place.

The touch sensor 818 may be configured to detect a touch by the user 102. For example, the touch sensor 818 may comprise a capacitive touch sensor array, a force sensing resistor array, an optical touch sensor, an ultrasonic touch sensor, and so forth. In some implementations, the touch sensor 818 may be arranged along one or both surfaces of the temples 808 that is facing away from the user 102.

Other electronics 822 may also be arranged within the HMWD 106. For example, the other electronics may include processors, batteries, and so forth such as described below in more detail with regard to FIG. 9.

Figure 9:
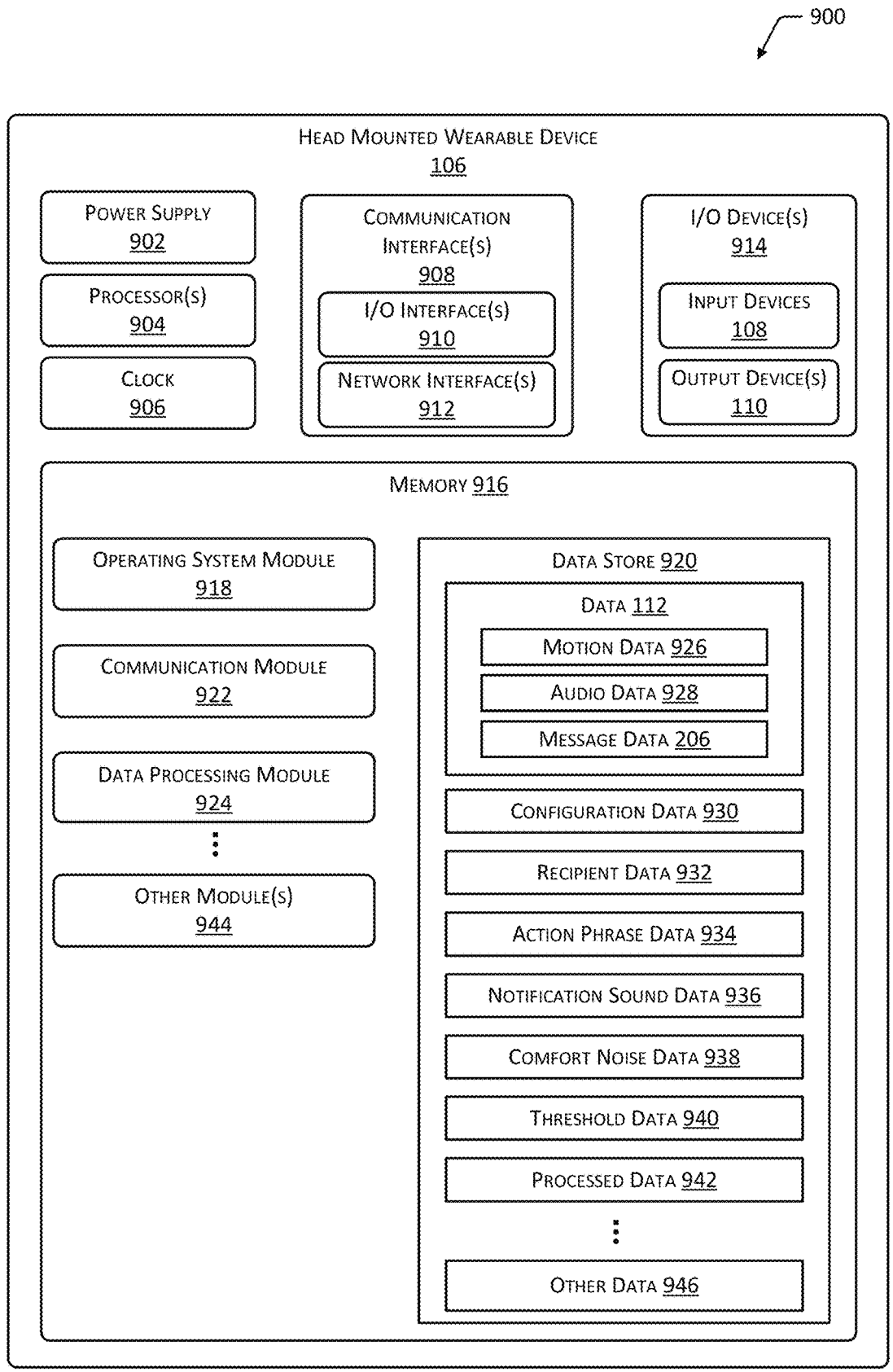
FIG. 9 is a block diagram of electronic components of the head-mounted wearable device, according to some implementations.

FIG. 9 is a block diagram 900 of electronic components of the HMWD 106, according to some implementations. The HMWD 106 may include one or more power supplies 902 that may be configured to provide electrical power suitable for operating the components in the HMWD 106. The one or more power supplies 902 may comprise batteries, capacitors, fuel cells, photovoltaic cells, wireless power receivers, conductive couplings suitable for attachment to an external power source such as provided by an electric utility, and so forth. For example, the batteries on board the HMWD 106 may be charged wirelessly, such as through inductive power transfer. In another implementation, electrical contacts may be used to recharge the HMWD 106.

The HMWD 106 may include one or more hardware processors 904 (processors) configured to execute one or more stored instructions. The processors 904 may comprise one or more cores. One or more clocks 906 may provide information indicative of date, time, ticks, and so forth. For example, the processor 904 may use data from the clock 906 to associate a particular interaction with a particular point in time.

The HMWD 106 may include one or more communication interfaces 908 such as input/output (I/O) interfaces 910, network interfaces 912, and so forth. The communication interfaces 908 enable the HMWD 106, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include input devices 108 such as one or more sensors. The sensors may include one or more microphones configured to acquire information indicative of sound present in the environment. The microphones may operate via transmission using an ambient atmosphere, such as air, or via bone conduction with the user 102. For example, the transducer 722 may be positioned within the frame bridge 710 of the HMWD 106 to provide audio of the user 102. In comparison, environment microphones may provide audio of the environment around the user 102. In some implementations, arrays of microphones may be used. These arrays may implement beamforming techniques to provide for directionality of gain. The system 100 may use the one or more microphones to accept voice input from the user 102, determine the location of others around the HMWD 106, determine ambient noise level, and so forth. In some implementations, output from the microphones may be processed to provide for active noise cancellation.

The input devices 108 may include one or more cameras. The one or more cameras may include imaging sensors configured to acquire images of a scene. The imaging sensors are configured to detect light in one or more wavelengths including, but not limited to, terahertz, infrared, visible, ultraviolet, and so forth. The imaging sensors may comprise charge coupled devices (CCD), complementary metal oxide semiconductor (CMOS) devices, microbolometers, and so forth. The system 100 may use image data acquired by the cameras during operation.

One or more 3D sensors may also be included in the input devices 108. The 3D sensors are configured to acquire spatial or 3D data, such as depth information, about objects within a field of view of a sensor. The 3D sensors include range cameras, lidar systems, sonar systems, radar systems, structured light systems, stereo vision systems, optical interferometry systems, and so forth. The system 100 may use the 3D data acquired by the 3D sensors to identify objects, determine a location of an object in 3D real space, determine a size or shape of an object, and so forth.

One or more buttons may be configured to accept input from the user 102. The buttons may comprise mechanical, capacitive, optical, or other mechanisms. For example, the buttons may comprise mechanical switches configured to accept an applied force from a touch of the user 102 to generate an input signal. The system 100 may use data from the buttons to receive information from the user 102. For example, the HMWD 106 may be configured with a button to accept input from the user 102 and send information indicative of the input to the system 100.

The input devices 108 may include one or more touch sensors. The touch sensors may use resistive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The system 100 may use data from the touch sensors to receive information from the user 102.

The sensors may also include one or more proximity sensors. For example, the HMWD 106 may include a proximity sensor. Data from the proximity sensor may be used to determine when the HMWD 106 is being worn. For example, when the proximity sensor indicates that the user 102 is not wearing the HMWD 106, the HMWD 106 may be placed into a low power or off mode to conserve power.

The proximity sensors may use optical, electrical, ultrasonic, electromagnetic, or other techniques to determine a presence of an object. In some implementations, the proximity sensors may use an optical emitter and an optical detector to determine proximity. For example, an optical emitter may emit light, a portion of which may then be reflected by the object back to the optical detector to provide an indication that the object is proximate to the proximity sensor. In other implementations, the proximity sensors may comprise a capacitive proximity sensor configured to provide an electrical field and determine a change in electrical capacitance due to presence or absence of an object within the electrical field.

The proximity sensors may be configured to provide sensor data indicative of one or more of a presence or absence of an object, a distance to the object, or characteristics of the object. An optical proximity sensor may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor such as a camera. Based on an apparent distance between the features of the structured light pattern, the distance to the object may be calculated. Other techniques may also be used to determine distance to the object. In another example, the color of the reflected light may be used to characterize the object, such as skin, clothing, and so forth.

The sensors may include one or more optical sensors. The optical sensors may include photodiodes, photoresistors, photovoltaic cells, quantum dot photoconductors, bolometers, pyroelectric infrared detectors, and so forth. For example, the optical sensor may use germanium photodiodes to detect infrared light. The optical sensors may be configured to provide data indicative of one or more of color or intensity of light impinging thereupon. For example, the optical sensor may comprise a photodiode and associated circuitry configured to generate a signal or data indicative of an incident flux of photons. For example, the optical sensor may comprise an ambient light sensor such as the ISL76683 as provided by Intersil Corporation of Milpitas, Calif., USA, or the MAX44009 as provided by Maxim Integrated Products Inc. of San Jose, Calif., USA. In other implementations, other optical sensors may be used. The optical sensors may be sensitive to one or more of infrared light, visible light, or ultraviolet light. For example, the optical sensors may be sensitive to infrared light.

In some implementations, the data acquired by the optical sensors may be used to adjust operation of the HMWD 106. For example, the intensity of light emitted by the one or more display lights 724 may be adjusted based on ambient light levels. Continuing the example, in a dark room the intensity of the display lights 724 may be set to a very low level, while in bright daylight the intensity of the display lights 724 may be increased to maintain visibility.

One or more radio frequency identification (RFID) readers, near field communication (NFC) systems, and so forth, may be included as sensors. For example, the RFID readers may be configured to read the RF tags. Information acquired by the RFID reader may be used by the system 100 to identify an object associated with the RF tag, determine a location of the RFID reader.

One or more RF receivers may also be included as sensors. In some implementations, the RF receivers may be part of transceiver assemblies. The RF receivers may be configured to acquire RF signals associated with Wi-Fi, Bluetooth, ZigBee, 3G, 4G, LTE, or other wireless data transmission technologies. The RF receivers may provide information associated with data transmitted via radio frequencies, signal strength of RF signals, and so forth.

As described above, the input devices 108 may include motion sensors 820. The motion sensors 820 may include one or more accelerometers. The accelerometers may provide information such as the direction and magnitude of an imposed acceleration. Data such as rate of acceleration, determination of changes in direction, speed, and so forth, may be determined using the accelerometers. In some implementations the accelerometers may detect a local "down" such as produced by gravity. The HMWD 106 may use one or more accelerometers to determine when the user 102 has moved their head in a particular direction, such as up and to the left.

A gyroscope may provide information indicative of rotation of an object affixed thereto. For example, HMWD 106 may be equipped with a gyroscope to provide data indicative of a change in orientation of the user's 102 head while wearing the HMWD 106.

A magnetometer may be used to determine an orientation by measuring ambient magnetic fields, such as the terrestrial magnetic field. The magnetometer may be worn or carried by the user 102, mounted to the HMWD 106, and so forth. For example, the magnetometer mounted to the HMWD 106 and may act as a compass and provide information indicative of which direction the HMWD 106 is oriented.

A location determination sensor may use one or more systems or other sensors to determine a location with respect to one or more reference points. These systems may include radio position finding systems, satellite-based navigation systems, inertial navigation systems, dead reckoning navigation systems, network positioning systems, tags and so forth. The satellite-based navigation system may include one or more of a Global Positioning System ("GPS") receiver, a global navigation satellite system ("GLONASS") receiver, a Galileo receiver, an Indian Regional Navigational Satellite System, and so forth.

The input devices 108 may include biomedical sensors that provide information about the user's pulse, oxygen saturation level of blood, respiration rate, and so forth. Other sensors may also be included in the input devices 108. For example, the other sensors may include thermometers, barometric sensors, hygrometers, biometric input devices such as iris readers, fingerprint readers, and so forth. For example, the system 100 may use biometric input acquired from biometric input devices to determine identity.

The I/O devices 914 may also include output devices 110 such as one or more of a display device, display lights 724, speakers for presenting audio, and so forth. In some embodiments, the I/O devices 914 may be physically incorporated with the HMWD 106 or may be externally placed. The output devices 110 are configured to generate signals, which may be perceived by the user 102 or may be detected by sensors.

In some implementations, the display devices may be configured to present images. For example, the display device may comprise an addressable display or bitmap display. The addressable display may comprise elements that may be independently addressable to produce output, such as pixels. For example, the addressable display may produce an image using a two-dimensional array of pixels. In comparison, individual display lights 724 do not produce a bitmap image.

Haptic output devices 110(1) are configured to provide a signal that results in a tactile sensation to the user 102. The haptic output devices 110(1) may use one or more mechanisms such as electrical stimulation or mechanical displacement to provide the signal. For example, the haptic output devices 110(1) may be configured to generate a modulated electrical signal, which produces an apparent tactile sensation in one or more fingers of the user 102. In another example, the haptic output devices 110(1) may comprise piezoelectric or rotary motor devices configured to provide a vibration, which may be felt by the user 102. In some implementations, the haptic output devices 110(1) may be used to produce vibrations that may be transferred to one or more bones in the head, producing the sensation of sound.

One or more audio output devices 110(2) may be configured to provide acoustic output. For example, the audio output devices 110(2) may comprise air conduction speakers 816. The acoustic output includes one or more of infrasonic sound, audible sound, or ultrasonic sound. The audio output devices 110(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output. The acoustic output may be transferred by the vibration of intervening gaseous and liquid media, such as adding air, or by direct mechanical conduction. For example, an audio output device 110(2) located within the temple 808 may provide an audio signal to the user of the HMWD 106 by way of bone conduction to the user's skull, such as the mastoid process or temporal bone. In some implementations the speaker or sound produced therefrom may be placed within the ear of the user, or may be ducted towards the ear of the user. For example, the speakers 816 in the temples 808 may comprise transducers that produce haptic feedback comprising vibrations that may be in the range of between 0.5 and 500 Hertz, or may be used to produce vibrations between 20 and 20,000 Hz that produce the sensation of sound in the user's head via bone conduction.

The display devices may be configured to provide output, which may be seen by the user 102 or detected by a light-sensitive sensor such as a camera or an optical sensor. In some implementations, the display devices may be configured to produce output in one or more of infrared, visible, or ultraviolet light. The output may be monochrome or color.

The display devices may be emissive, reflective, or both. An emissive display device, such as using light emitting diodes (LEDs), is configured to emit light during operation. For example, the display light 724 may comprise emissive display devices. In comparison, a reflective display device, such as using an electrophoretic element, relies on ambient light to present an image. Backlights or front lights may be used to illuminate non-emissive display devices to provide visibility of the output in conditions where the ambient light levels are low.

The display devices may include, but are not limited to, microelectromechanical systems (MEMS), spatial light modulators, electroluminescent displays, quantum dot displays, liquid crystal on silicon (LCOS) displays, cholesteric displays, interferometric displays, liquid crystal displays (LCDs), electrophoretic displays, and so forth. For example, the display device may use a light source and an array of MEMS-controlled mirrors to selectively direct light from the light source to produce an image. These display mechanisms may be configured to emit light, modulate incident light emitted from another source, or both. The display devices 110(3) may operate as panels, projectors, and so forth.

The display devices may include image projectors. For example, the image projector may be configured to project an image onto a surface or object, such as the lens 714. The image may be generated using MEMS, LCOS, lasers, and so forth.

Other display devices may also be used by the HMWD 106. Other output devices 110(P) may also be present. For example, the other output devices 110(P) may include scent/odor dispensers.

The network interfaces 912 may be configured to provide communications between the HMWD 106 and other devices, such as the server 116. The network interfaces 912 may include devices configured to couple to personal area networks (PANs), local area networks (LANs), wide area networks (WANs), and so forth. For example, the network interfaces 912 may include devices compatible with Ethernet, Wi-Fi, Bluetooth, Bluetooth Low Energy, ZigBee, and so forth.

The HMWD 106 may also include one or more busses or other internal communications hardware or software that allow for the transfer of data between the various modules and components of the HMWD 106.

As shown in FIG. 9, the HMWD 106 includes one or more memories 916. The memory 916 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 916 provides storage of computer-readable instructions, data structures, program modules, and other data for the operation of the HMWD 106. A few example functional modules are shown stored in the memory 916, although the same functionality may alternatively be implemented in hardware, firmware, or as a system on a chip (SoC).

The memory 916 may include at least one operating system (OS) module 918. The OS module 918 is configured to manage hardware resource devices such as the I/O interfaces 910, the I/O devices 914, the communication interfaces 908, and provide various services to applications or modules executing on the processors 904. The OS module 918 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 916 may be a data store 920 and one or more of the following modules. These modules may be executed as foreground applications, background tasks, daemons, and so forth. The data store 920 may use a flat file, database, linked list, tree, executable code, script, or other data structure to store information. In some implementations, the data store 920 or a portion of the data store 920 may be distributed across one or more other devices including servers, network attached storage devices, and so forth.

A communication module 922 may be configured to establish communications with one or more of the other HMWDs 106, the user device 120, servers 116, external sensors, or other devices. The communications may be authenticated, encrypted, and so forth.

The memory 916 may store a data processing module 924. The data processing module 924 may provide one or more of the functions described herein. For example, the data processing module 924 may be configured to determine the occurrence of a gesture 104, determine verbal input such as the user 102 speaking an action phrase, awaken the HMWD 106 from a sleep state, perform natural language processing, and so forth.

In one implementation the natural language processing may utilize one or more of the techniques described by U.S. Pat. No. 9,070,366 entitled "Architecture For Multi-Domain Utterance Processing" to Lambert Mathias et al. filed Dec. 19, 2012 which is incorporated by reference for all that it discloses. In other implementations, other techniques may be utilized.

The data processing module 924 may utilize one or more of the data 112 or other data that may be stored at least in part within the data store 920. The data 112 may include one or more of motion data 926, audio data 928, message data 206, and so forth. The motion data 926 comprises information generated by one or more of the motion sensors 820. For example, the motion data 926 may comprise information indicative of accelerations and rotations produced by an IMU. The audio data 928 may comprise digitized audio information, such as obtained from a microphone 812, the transducer 722, or that is suitable for presentation by speaker 816. The message data 206 may comprise information to be transferred via the asynchronous, synchronous, or other communication modes. The message data 206 may comprise one or more of textual data, telemetry, images, audio data 928, or other information. For example, the message data 206 may comprise the text of an SMS message and an image obtained by a camera on the HMWD 106.

The data store 920 may also store configuration data 930. The configuration data 930 may include user preferences, device configuration settings, and so forth. For example, the configuration data 930 may specify a user's preference of a mixing level indicating how much environmental audio is to be included in the message data 206 relative to audio obtained from the transducer 722.

The data store 920 may also store recipient data 932. The recipient data 932 may comprise information such as the names of different recipients, address information used to establish communication with those recipients, configurations as to which gesture 104 is associated with a particular recipient, and so forth. For example, the recipient data 932 may indicate that a gesture 104 of the user 102 turning their head to the left is associated with the user Catherine 102(3) with address information suitable for establishing contact such as an account name, network address, messaging address, and so forth. The address information may include, but is not limited to one or more of an email address, telephone number, network address, uniform resource locator, and so forth.

The data store 920 may also store action phrase data 934. The action phrase data 934 may comprise a set of one or more sounds that may be uttered by the user 102 and as associated action. For example, the phrase "Hey" may be associated with an action of "begin communication" while the phrase "just a second" may be associated with the action of pausing communication.

The data store 920 may also store notification sound data 936. The notification sound data 936 may comprise digitized audio that has either been recorded from an actual source, has been computer-generated, or as a combination thereof. The notification sound data 936 may be used to provide cues to the user 102 as to the context of a communication. For example, the notification sound data 936 may include office sounds, sports events sounds, household sounds, and so forth. In one implementation, depending upon the context of the communication such as who the recipient is and where they are located, a particular notification sound data 936 may be present. Continuing the example, while the user Abbott 102(1) records a message to send asynchronously to his friend Frank 102(6), Abbott 102(1) may hear played at a low level using the speakers 816 in his HMWD 106(1) a loop of notification sound data 936 that was recorded at a baseball game.

The notification sound data 936 may also comprise other sounds. For example, the notification sound data 936 may comprise tones, beeps, sound effects, and so forth. These other sounds may also be used to provide information to the user 102 during operation. For example, when the communication 118 with another user 102 is transmitted as a text message rather than audio, the system may present the notification sound data 936 that is reminiscent of the sound of a typewriter indicating the transcription to text, followed by presenting a notification sound data 936 of a "whoosh" indicating the message has been sent.

The data store 920 may also store comfort noise data 938. The comfort noise data 938 may comprise digitized audio that is used to fill in what would otherwise be audibly empty spaces that may be disconcerting for the user 102. For example, some VOIP protocols result in "dead air" or quiet spaces during which a user 102 may incorrectly believe that communication has ceased when in fact communication is still in progress. The comfort noise data 938 may be presented during these quiet spaces, or as an overlay in conjunction with audio associated with communication. For example, the comfort noise data 938 may comprise white noise or pink noise.

The data store 920 may also store threshold data 940 which may specify one or more thresholds, such as permissible tolerances or variances, time limits, and so forth. For example, the threshold data 940 may specify the minimum amount of acceleration and rotation that are associated with a particular gesture 104. In another example, the threshold data 940 may include values that specify the synchronous initiation time window 312, the asynchronous initiation time window 328, and so forth.

The data processing module 924 or other modules may use one or more of the different pieces of data that are stored in the data store 920 to generate processed data 942. For example, the processed data 942 may comprise a transcription of audio spoken by the user 102 as obtained from the transducer 722, image data to present, and so forth. In some implementations, the processed data 942 may include message data 206 that is to be sent to another device. In some implementations, one or more of the functions described with regard to the HMWD 106 may be performed by another device, such as the server 116 or the user device 120. For example, the HMWD 106 may transfer the audio data 928 received from the transducer 722 to the server 116 for further processing. In some implementations, functions such as the detection of action phrases may be performed locally by the HMWD 106.

The data processing module 924 may control the transition of the communication between users and between the asynchronous communication mode and the synchronous communication mode described above, such as with regard to FIG. 3. By using information such as the gestures 104, the use of action phrases, content of the message data 206, and so forth the system allows for seamless communication between the user 102 wearing the HMWD 106, and other resources such as the service 204 or other users 102.

Techniques such as artificial neural networks (ANN), active appearance models (AAM), active shape models (ASM), principal component analysis (PCA), cascade classifiers, and so forth, may also be used to process the data 112. For example, the ANN may be trained using a supervised learning algorithm such that particular sounds or changes in orientation of the user's head are associated with particular actions to be taken. Once trained, the ANN may be provided with the data 112 and provide, as output, a transcription of the words spoken by the user, orientation of the user's head, and so forth. In some implementations the data 112 may comprise image data. For example, cascade classifiers may be used for facial recognition, such as the Viola-Jones face detection.

Other modules 944 may also be present in the memory 916 as well as other data 946 in the data store 920. For example, the other modules 944 may include an interface module to establish communication with user device 120 and to provide the graphical user interface 604 to the user device 120.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Figure 10:
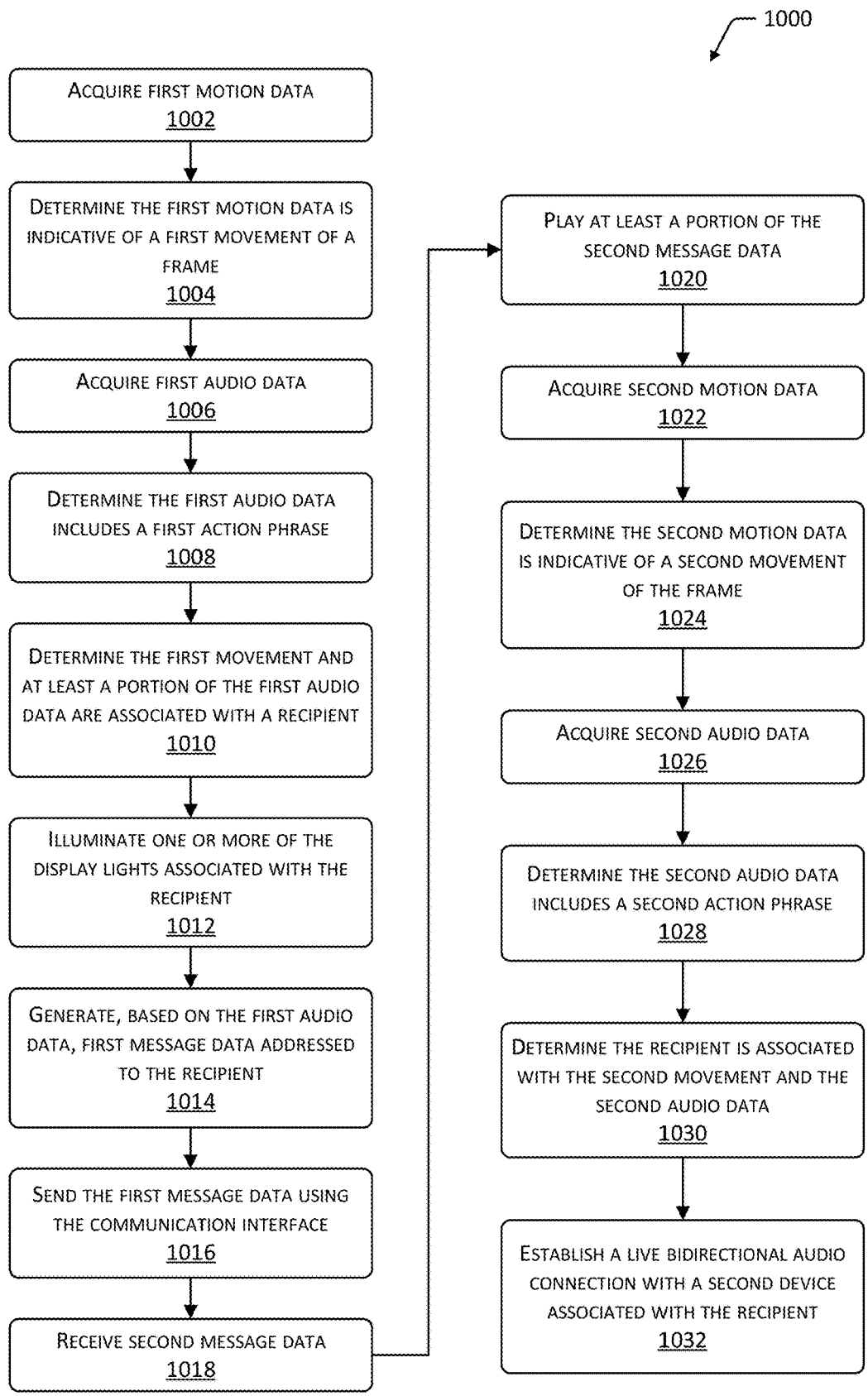
FIG. 10 depicts a flow diagram of a process to use a gesture of a first user wearing a head-mounted wearable device to control communication with another user, according to some implementations.

FIG. 10 depicts a flow diagram 1000 of a process to use a gesture 104 of a first user 102 wearing a HMWD 106(1) to control communication with another user 102, according to some implementations. The process may be performed at least in part by one or more of the HMWD 106, the server 116, the user device 120, or other devices.

At 1002 first motion data 926 is acquired from the motion sensor 820. For example, data emitted by the motion sensor 820 from a first time to a second time may be used as the first motion data 926.

The first motion data 926 may be indicative of one or more motions, gestures, sequences, and so forth. For example, the first motion data 926 may be indicative of movement of the HMWD 106 to one or more of a left position or a right position relative to a center position. A first recipient may be associated with the left position and a second recipient may be associated with the right position. By turning their head, the user 102 may thus select a particular recipient. The first motion data 926 may be indicative of other motions, such as tilting the head up, tilting the head down, nodding, shaking the head, and so forth. For example, the first motion data 926 may be indicative of the HMWD 106 turning to one side, the HMWD 106 turning to a first side and then a second side, the HMWD 106 being tilted up, or the HMWD 106 being tilted down, and so forth.

At 1004 the first motion data 926 is processed to determine the first motion data 926 is indicative of a first movement of the HMWD 106. For example, the first movement may be a turn of the head to the left.

At 1006 first audio data 928 is acquired by the HMWD 106. For example, signals from an air conduction microphone 812, transducer 722, or both may be digitized to produce the first audio data 928.

In some implementations, the determination of a recipient may be based on the gesture 104, such as described below. Based at least in part on the gesture 104, notification sound data 936 may be presented during acquisition of the audio data 928. For example, where the first movement is indicative of a gesture 104 and for that is associated with the user Catherine 102(3), the recipient data 932 may indicate that a specific notification sound data 936 of "office sounds" is presented at low volume to the user Abbott 102(1) of the HMWD 106(1) while recording the message for Catherine.

At 1008 the first audio data 928 is determined to include a first action phrase. For example, the data processing module 924 may process the audio data 928 to determine if one or more of the action phrases indicated by the action phrase data 934 are present. This processing may comprise one or more of pattern matching, automated speech recognition, and so forth. For example, the action phrase "Hey" may be detected. In some implementations, the automated speech recognition may be limited to a relatively small set of preprogrammed words or phrases. In other implementations, natural language processing techniques may be used.

At 1010 the first movement and at least a portion of the first audio data 928 are determined to be associated with a recipient. For example, the first movement comprising a turn of the head to the left may be associated with the user Catherine 102(3). This association may be included in a data store 920, such as in the configuration data 930. Continuing the example, a first portion of the first audio data 928 may be processed to determine if the name "Catherine" is present.

In some implementations, the determination of the recipient may be based on the gesture 104, and not on the audio data 928. For example, the gesture 104 expressed by the first movement may be sufficient to designate the user Catherine 102(3) as the recipient. In some implementations, the presence of an action phrase such as the word "Hey" may be used as a confirmatory signal to begin acquiring message data 206, such as the first audio data 928.

At 1012 one or more of the display lights 724 associated with the recipient are illuminated. The display lights 724 that are illuminated may be at a particular location with respect to the front frame 706, that particular location being associated with the recipient. The display lights 724 may be illuminated with a particular color that is also associated with the recipient. For example, previously defined settings may associate the user Catherine 102(3) with a green colored light to the left of the wearer's field of vision.

At 1014 based on the first audio data 928, first message data 206 is generated. The first message data 206 may then be addressed to the recipient. For example, the audio data 928 may be processed by adding address information and used to form the first message data 206.

At 1016 the first message data 206 is sent using the communication interface. For example, the first message data 206 may be sent via a Bluetooth connection to the user device 120 that in turn uses the network 114 to send the message data 206 to the server 116.

At 1018 the first HMWD 106(1) receives second message data 206. For example, the user Catherine 102(3) may have replied to the first message data 206.

At 1020 at least a portion of second message data 206 is played by the first HMWD 106(1). For example, the second message data 206 may comprise digitized speech that is presented using one or more of the speakers 816.

The processes described until now may be operating in the asynchronous communication mode. In some situations, the user 102 wearing the HMWD 106 may wish to initiate synchronous communication. The following steps describe the situation where the user Abbott 102(1) is initiating synchronous communication.

At 1022 second motion data 926 is obtained. For example, the motion data 926 may be indicative of another turn of the user Abbott's 102(1) head to the left.

At 1024 the second motion data 926 is determined to be indicative of the second movement of the frame.

At 1026 second audio data 928 is obtained by the first HMWD 106(1). For example, the user Abbott 102(1) may begin speaking to Catherine. As described above, in some implementations notification sound data 936 may be presented by the first HMWD 106(1) during acquisition of the audio data 928.

At 1028 second audio data 928 is determined to include a second action phrase. In some situations, the second action phrase may be the same as the first action phrase. In some implementations, the requirement for a second action phrase may be omitted, and synchronous communication may be initiated based on the gesture 104 alone.

At 1030 the recipient associated with the second movement and the second audio data 928 is determined. In a situation where the recipient is the same as the sender of the last message data that was presented, the process may proceed to 1032. For example, when the recipient designated by the second movement is the user Catherine 102(3) and the second message data 206 was from Catherine, the process may proceed to 1032.

At 1032 a live bidirectional audio connection is established with the second device that is associated with the recipient. For example, a VOIP audio connection may be established between the first HMWD 106(1) worn by the first user Abbott 102(1) and a second HMWD 106(2) worn by the recipient user Catherine 102(3).

In other implementations, the transition from asynchronous to synchronous communication mode, or vice versa, may be responsive to the generation of additional message data 206 within particular time windows, and so forth.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure are provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A head-mounted wearable device comprising:
a frame;
a microphone supported by the frame;
a motion sensor supported by the frame, wherein the motion sensor comprises one or more of an accelerometer or a gyroscope;
one or more speakers supported by the frame;
a communication interface supported by the frame;
a memory, storing computer-executable instructions; and a hardware processor to execute the computer-executable instructions to:
acquire first motion data from the motion sensor;
determine the first motion data is indicative of a first movement of the frame, the first movement of the frame corresponding to a first side;
acquire first audio data from the microphone;
determine the first audio data includes a first action phrase;
determine the first movement and at least a portion of the first audio data are associated with a recipient;
generate first message data based on the first audio data;
address the first message data to the recipient;
send the first message data using the communication interface; and
generate audio output using a first speaker on the first side at a greater amplitude than audio output emitted by a second speaker on a second side opposite the first side.

2. The head-mounted wearable device of claim 1, further comprising:
one or more display lights supported by the frame at one or more particular locations with respect to the frame that are visible to a wearer;
the hardware processor to further execute the computer-executable instructions to:
determine at least one of the one or more display lights associated with the recipient;
determine a particular color of illumination that is associated with the recipient; and
illuminate the at least one of the one or more display lights associated with the recipient with the particular color.

3. The head-mounted wearable device of claim 1, to further execute the computer-executable instructions to:
receive second message data;
generate audio using the one or more speakers based on at least a portion of the second message data;
acquire second audio data from the microphone;
acquire second motion data from the motion sensor;
determine the second audio data includes a second action phrase;
determine the second motion data is indicative of a second movement of the frame;
determine the recipient is associated with the second movement and the second audio data; and
establish a live bidirectional audio connection with a second device associated with the recipient.

4. The head-mounted wearable device of claim 1, wherein the first movement of the frame corresponds to the wearer turning their head to the first side; and
the hardware processor to further execute the computer-executable instructions to:
receive second message data, wherein the audio output is generated based on at least a portion of the second message data.

5. A method comprising:
acquiring first motion data from a motion sensor of a head-mounted wearable device;
determining the first motion data is indicative of a first movement of the head-mounted wearable device, wherein the first movement comprises movement of the head-mounted wearable device to one or more of a left position or a right position relative to a center position;
acquiring first audio data from a microphone of the head-mounted wearable device;
determining the first audio data includes a first action phrase;
determining the first movement is associated with a recipient, wherein a first recipient is associated with the left position and a second recipient is associated with the right position;
generating first message data based on the first audio data;
addressing the first message data to the recipient; and
sending the first message data using a communication interface.

6. The method of claim 5, wherein the method is executing at least in part on a server external to the head-mounted wearable device.

7. The method of claim 5, wherein the first motion data is indicative of one or more of:
the head-mounted wearable device turning to one side,
the head-mounted wearable device turning to a first side and then a second side,
the head-mounted wearable device being tilted up, or
the head-mounted wearable device being tilted down.

8. The method of claim 5, further comprising:
performing automated speech recognition on at least a portion of the first audio data to determine information indicative of the recipient; and
wherein determining the recipient is based at least in part on the information indicative of the recipient.

9. The method of claim 5, further comprising:
determining first notification sound data associated with the recipient; and
during the acquiring of the first audio data, presenting the first notification sound data using one or more speakers of the head-mounted wearable device.

10. The method of claim 5, further comprising:
receiving second message data;
generating audio output from one or more speakers of the head-mounted wearable device using at least a portion of the second message data;
acquiring second motion data from the motion sensor of the head-mounted wearable device;
determining the second motion data is indicative of a second movement;
determining the second movement is associated with the recipient;
acquiring third audio data from the microphone of the head-mounted wearable device;
generating, based on the third audio data, third message data addressed to the recipient;
determining the second movement and the third audio data occurred within a threshold time of presenting the at least a portion of the second message data;
establishing a bidirectional real-time connection with a computing device associated with the recipient; and
sending the third message data using the communication interface using the bidirectional real-time connection.

11. The method of claim 10, further comprising:
determining a threshold value of time has elapsed since one or more of sending or receiving fourth message data using the bidirectional real-time connection; and
discontinuing the bidirectional real-time connection.

12. The method of claim 10, further comprising,
determining notification sound data associated with the recipient; and
generating audio using the one or more speakers of the head-mounted wearable device based on the notification sound data while the bidirectional real-time connection is established.

13. A system comprising:
a memory, storing computer-executable instructions; and
a hardware processor to execute the computer-executable instructions to:
- acquire first motion data from a motion sensor of a head-mounted wearable device;
- determine the first motion data is indicative of a first movement;
- determine the first movement is associated with a recipient;
- acquire first audio data from a microphone of the head-mounted wearable device;
- generate, based on the first audio data, first message data;
- send the first message data to an address associated with the recipient;
- receive second message data, from the recipient, that is responsive to the first message data; and
- responsive to the receipt of the second message data, establish a bidirectional real-time connection with a computing device associated with the recipient.

14. The system of claim 13, the hardware processor to further execute the computer-executable instructions to:
- determine first notification sound data associated with the recipient; and
- present the first notification sound data using one or more speakers while acquiring the first audio data.

15. The system of claim 13, wherein the first motion data is indicative of a turn toward a first side; and the hardware processor to further execute the computer-executable instructions to:
- generate audio output, using one or more speakers, that is based on at least a portion of the second message data, wherein the audio output from speakers on the first side has a greater amplitude than the audio output emitted by speakers on a second side, wherein the second side is opposite the first side.

16. The system of claim 13, the hardware processor to further execute the computer-executable instructions to:
- generate audio output using one or more speakers of the head-mounted wearable device that is based on at least a portion of the second message data;
- acquire second motion data from the motion sensor of the head-mounted wearable device;
- determine the second motion data is indicative of a second movement;
- determine the second movement is associated with the recipient;
- acquire third audio data from the microphone of the head-mounted wearable device;
- determine the second movement and the third audio data occurred within a threshold time of presenting the at least a portion of the second message data; and
- send the third message data using a communication interface using the bidirectional real-time connection.

17. The system of claim 16, the hardware processor to further execute the computer-executable instructions to:
- determine a threshold value of time has elapsed since receiving fourth message data using the bidirectional real-time connection; and
- discontinue the bidirectional real-time connection.

18. The system of claim 16, the hardware processor to further execute the computer-executable instructions to:
- acquire fourth audio data;
- determine the fourth audio data includes a first action phrase; and
- discontinue the bidirectional real-time connection.

19. The system of claim 13, the hardware processor to further execute the computer-executable instructions to:
- activate, based on the recipient, a display light of the head-mounted wearable device, wherein the motion sensor, the microphone, and one or more speakers are supported by the head-mounted wearable device;
- determine first notification sound data associated with the recipient; and
- generate audio output using the one or more speakers of the head-mounted wearable device based on the first notification sound data while acquiring the first audio data.

20. The method of claim 5, wherein the first movement comprises a turn toward a first side; and further comprising:
- receiving second message data; and
- generating audio output that is based on at least a portion of the second message data, wherein the audio output from a first speaker on the first side has a greater amplitude than the audio output emitted by a second speaker on a second side, wherein the second side is opposite the first side.

* * * * *

UNITED STATES PATENT AND TRADEMARK OFFICE
CERTIFICATE OF CORRECTION

PATENT NO. : 10,778,826 B1
APPLICATION NO. : 15/157324
DATED : September 15, 2020
INVENTOR(S) : Chia-Jean Wang et al.

Page 1 of 3

It is certified that error appears in the above-identified patent and that said Letters Patent is hereby corrected as shown below:

In the Claims

Column 29, Claim 1, Line 10:
Currently reads: "the first movement and at least a portion".
Where it should read: --the first movement of the frame and at least--.

Column 29, Claim 2, Line 25:
Currently reads: "that are visible to a wearer;".
Where it should read: --that are visible to a wearer; and--.

Column 29, Claim 3, Line 35:
Currently reads: "of claim 1, to".
Where it should read: --of claim 1, the hardware processor to--.

Column 29, Claim 4, Line 51:
Currently reads: "the first movement of the frame correspond to the wearer".
Where it should read: --the first movement of the frame corresponds to a wearer--.

Column 30, Claim 10, Line 45:
Currently reads: "acquiring third audio data".
Where it should read: --acquiring second audio data--.

Column 30, Claim 10, Line 47:
Currently reads: "based on the third audio data".
Where it should read: --based on the second audio data--.

Column 30, Claim 10, Line 49:
Currently reads: "and the third audio".
Where it should read: --and the second audio--.

Signed and Sealed this
Third Day of November, 2020

Andrei Iancu
*Director of the United States Patent and Trademark Office*

CERTIFICATE OF CORRECTION (continued)
U.S. Pat. No. 10,778,826 B1

Column 31, Claim 13, Lines 1 to 21:
Currently read: "A system comprising: a memory, storing computer-executable instructions; and a hardware processor to execute the computer-executable instructions to: acquire first motion data from a motion sensor of a head-mounted wearable device; determine the first motion data is indicative of a first movement; determine the first movement is associated with a recipient; acquire first audio data from a microphone of the head-mounted wearable device; generate, based on the first audio data, first message data; send the first message data to an address associated with the recipient; receive second message data, from the recipient, that is responsive to the first message data; and
responsive to the receipt of the second message data, establish a bidirectional real-time connection with a computing device associated with the recipient.".
Where they should read: --The method of claim 5, wherein the first movement comprises a turn toward a first side; and further comprising: receiving second message data; and generating audio output that is based on at least a portion of the second message data, wherein the audio output from a first speaker on the first side has a greater amplitude than the audio output emitted by a second speaker on a second side, wherein the second side is opposite the first side.--.

Column 32, Claim 16, Line 5:
Currently reads: "third audio data".
Where it should read: --second audio data--.

Column 32, Claim 16, Line 7:
Currently reads: "third audio data".
Where it should read: --second audio data--.

Column 32, Claim 16, Line 8:
Currently reads: "within a threshold time".
Where it should read: --within a first threshold time--.

Column 32, Claim 17, Line 13:
Currently reads: "determine a threshold value".
Where it should read: --determine a second threshold value--.

Column 32, Claim 18, Line 19:
Currently reads: "fourth audio data".
Where it should read: --third audio data--.

Column 32, Claim 18, Line 20:
Currently reads: "fourth audio data".
Where it should read: --third audio data--.

Column 32, Claim 20, Lines 36 to 44:
Currently read: "The method of claim 5, wherein the first movement comprises a turn toward a first side; and further comprising: receiving second message data; and generating audio output that is based on at least a portion of the second message data, wherein the audio output from a first speaker on the first side has a greater amplitude than the audio output emitted by a second speaker on a second side, wherein the second side is opposite the first side.".

Where they should read: --A system comprising: a memory, storing computer-executable instructions; and a hardware processor to execute the computer-executable instructions to: acquire first motion data from a motion sensor of a head-mounted wearable device; determine the first motion data is indicative of a first movement; determine the first movement is associated with a recipient; acquire first audio data from a microphone of the head-mounted wearable device; generate, based on the first audio data, first message data; send the first message data to an address associated with the recipient; receive second message data, from the recipient, that is responsive to the first message data; and responsive to the receipt of the second message data, establish a bidirectional real-time connection with a computing device associated with the recipient.--.